United States Patent [19]

Takayama et al.

[11] Patent Number: 5,841,599
[45] Date of Patent: Nov. 24, 1998

[54] REPRODUCING APPARATUS VARYING REPRODUCTION SPEED ACCORDING TO MEMORY FULLNESS

[75] Inventors: Nobutoshi Takayama; Koji Takahashi; Taizou Hori, all of Kanagawa; Kazuhiko Haruma, Tokyo, all of Japan

[73] Assignee: Canon Kabushiki Kaisha, Tokyo, Japan

[21] Appl. No.: 342,649

[22] Filed: Nov. 21, 1994

Related U.S. Application Data

[63] Continuation of Ser. No. 980,977, Nov. 24, 1992, abandoned.

[30] Foreign Application Priority Data

| Nov. 27, 1991 | [JP] | Japan | 3-312550 |
| Jun. 30, 1992 | [JP] | Japan | 4-196589 |

[51] Int. Cl.$^6$ .................................................. G11B 5/09
[52] U.S. Cl. .......................... 360/39; 395/877; 711/173; 369/60
[58] Field of Search .................................. 360/39, 72.01, 360/28, 74.4, 73.07, 64, 14.3, 32, 27, 10.1, 73.11, 77.15, 73.12, 10.2, 77.14, 72.2, 77.11, 31, 51, 73.09, 73.03; 364/200, 900; 395/425, 275, 250

[56] References Cited

U.S. PATENT DOCUMENTS

| 4,040,026 | 8/1977 | Gernelle | 364/900 |
| 4,040,027 | 8/1977 | Van Es et al. | 395/250 |
| 4,220,997 | 9/1980 | Hager | 360/73.09 X |
| 4,378,588 | 3/1983 | Katzman et al. | 364/200 |
| 4,413,289 | 11/1983 | Weaver et al. | 360/51 |
| 4,446,494 | 5/1984 | Stockham, Jr. et al. | 360/73.09 |
| 4,774,605 | 9/1988 | Kato | 360/72.2 |
| 4,864,430 | 9/1989 | Yoshimura et al. | 360/72.01 X |
| 4,872,073 | 10/1989 | Fincher et al. | 360/51 |
| 5,070,419 | 12/1991 | Kiyonaga | 360/72.2 |
| 5,210,829 | 5/1993 | Bitner | 360/31 X |
| 5,224,089 | 6/1993 | Matsumura et al. | 360/73.03 X |
| 5,243,588 | 9/1993 | Maeda et al. | 369/60 X |

FOREIGN PATENT DOCUMENTS 0420280  4/1991  European Pat. Off. .

Primary Examiner—Nabil Hindi
Assistant Examiner—Patrick Wamsley
Attorney, Agent, or Firm—Robin, Blecker & Daley

[57] ABSTRACT

A reproducing apparatus is arranged to reproduce data, which are recorded in the form of predetermined blocks on a track formed on a recording medium, by causing a reproducing head to trace the track while moving the recording medium, write the reproduced data into a memory circuit, and rearrange the written data on the basis of an address assigned to each of the blocks and contained in the written data, thereby restoring the written data to the original recorded data. The memory circuit has memory capacities respectively assigned to a plurality of blocks obtained by a trace of the reproducing head. The reproducing apparatus is provided with an adjustment circuit for adjusting the remaining memory capacity of each of the plurality of blocks in accordance with the state of storage of the data stored in the memory circuit.

33 Claims, 20 Drawing Sheets

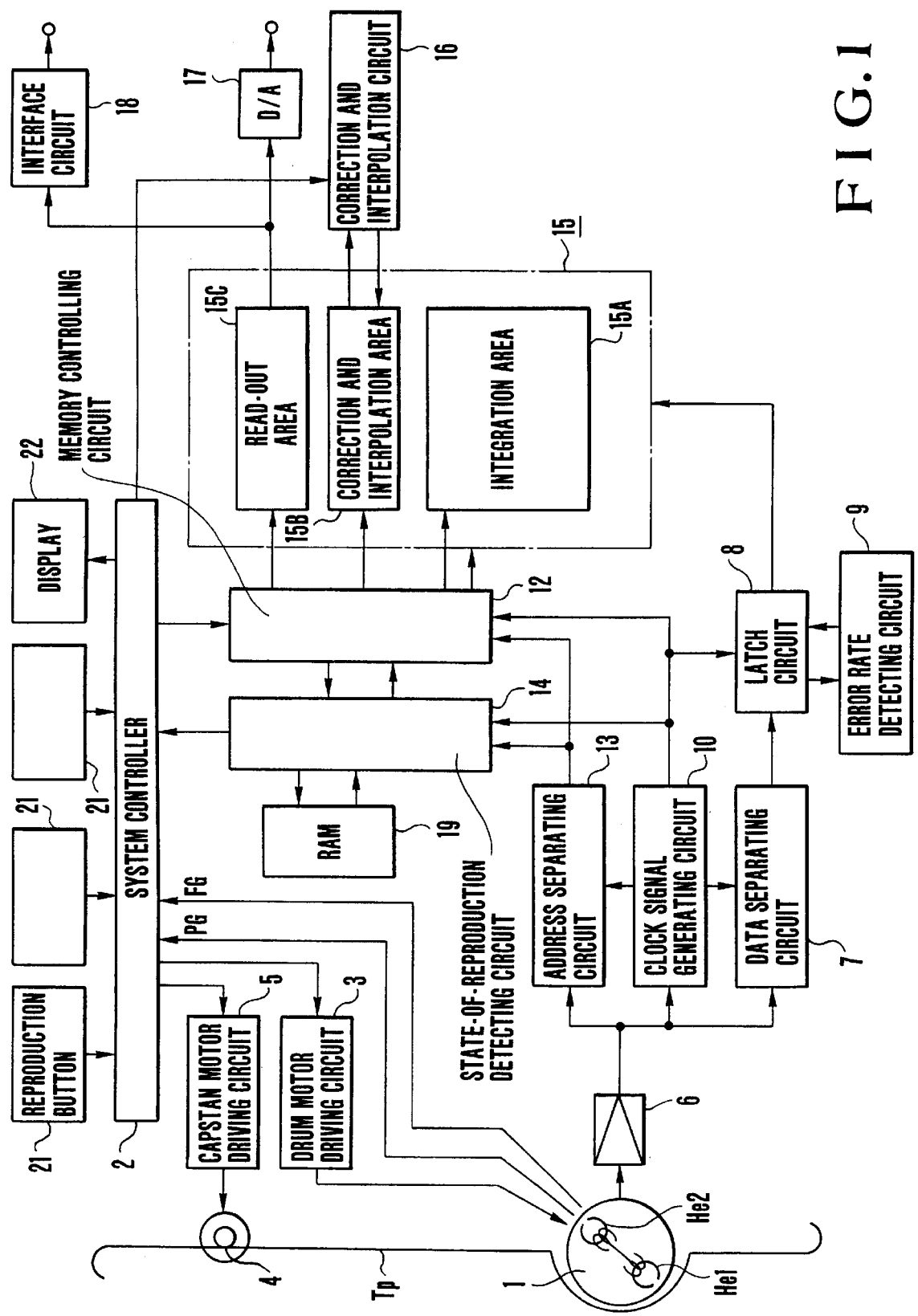
F I G.1

FIG.4(A) — T1 | T2 | (T3)A | T4 — DATA REPRODUCED FROM EACH TRACK ALONG TRACE A

FIG.4(B) — T2 | (T3)B | T4 — DATA REPRODUCED FROM EACH TRACK ALONG TRACE B

FIG.4(C) — T2 | (T3)C | T4 | T5 — DATA REPRODUCED FROM EACH TRACK ALONG TRACE C

FIG.4(D) — (T3)C | (T3)B | (T3)A — DATA REPRODUCED FROM TRACK T3 AND INTEGRATED ON MEMORY

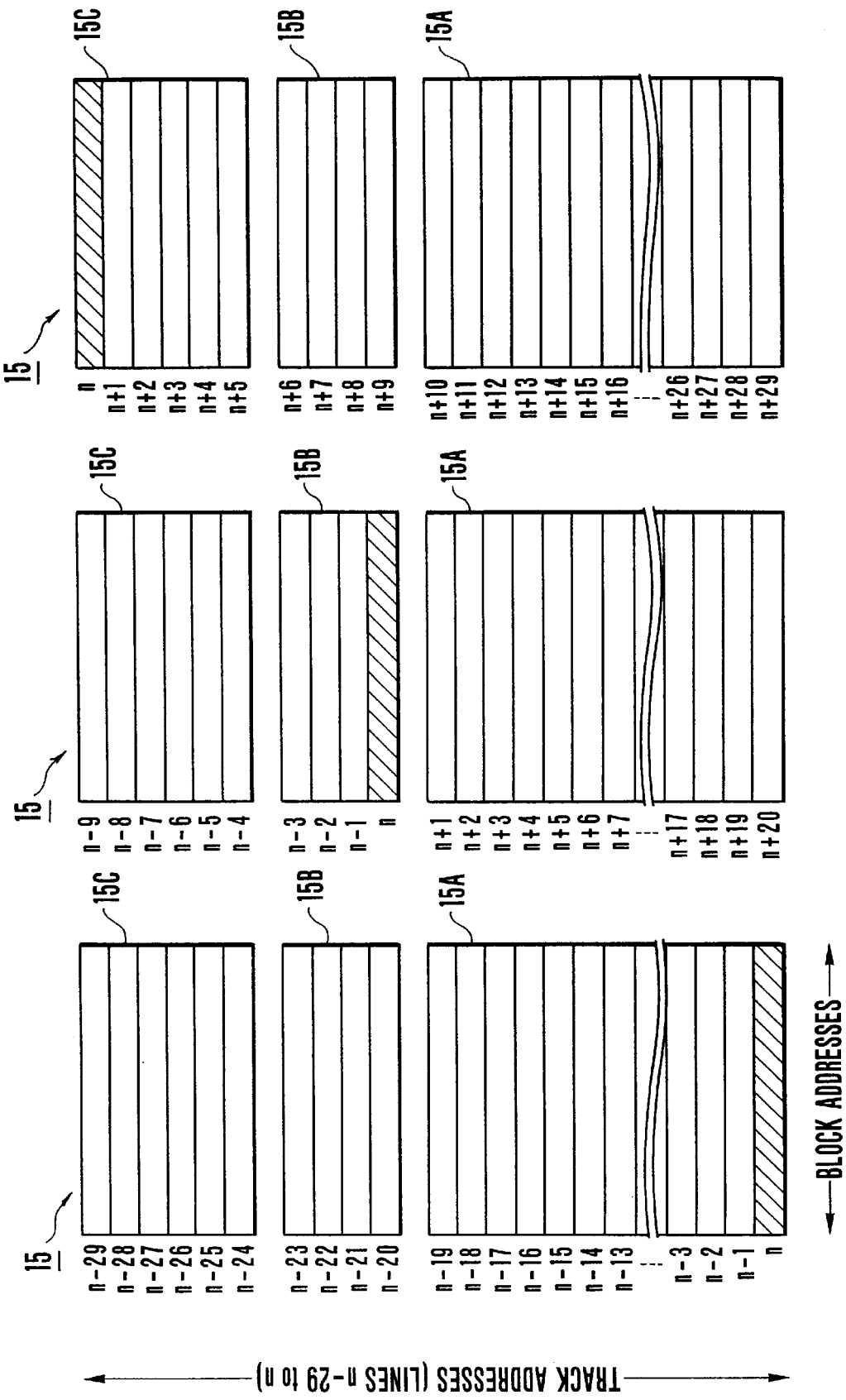

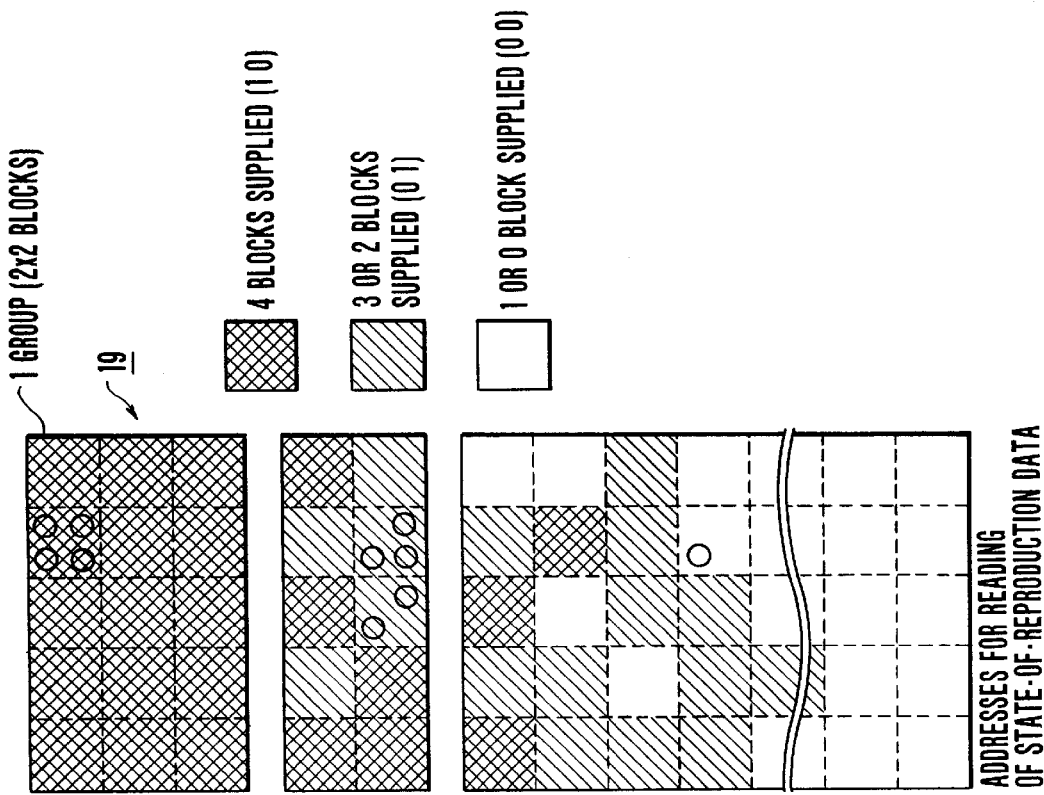
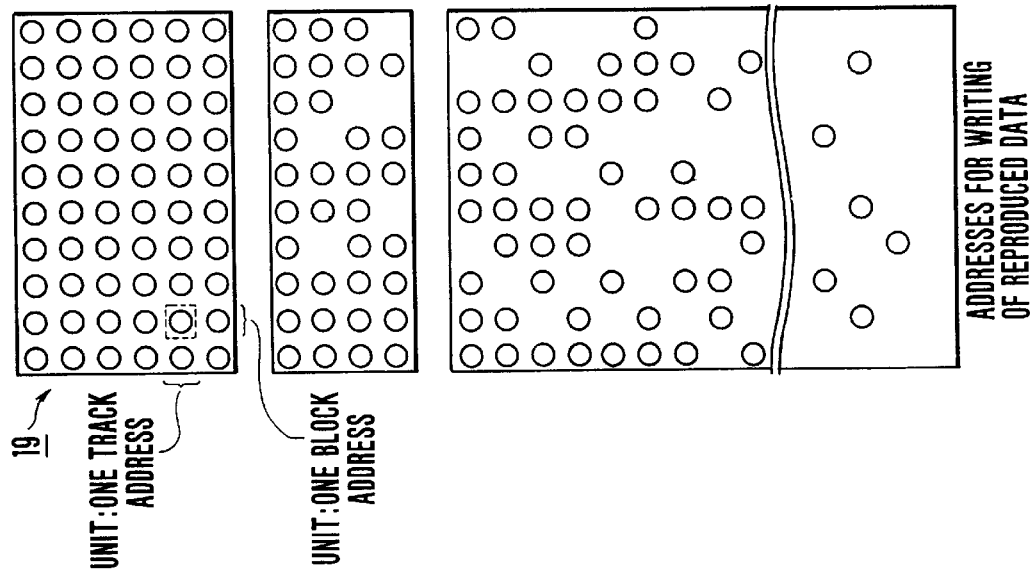

REPRODUCING APPARATUS VARYING REPRODUCTION SPEED ACCORDING TO MEMORY FULLNESS

This is a continuation application under 37 CFR 1.62 of prior application Ser. No. 07/980,977, filed Nov. 24, 1992, now abandoned.

BACKGROUND OF THE INVENTION

1. Field of the Invention:

The present invention relates to a reproducing apparatus arranged to reproduce various kinds of signals, such as an audio signal and a video signal digitally recorded on a recording medium such as a magnetic tape, by causing a reproducing head to trace the recording medium.

2. Description of the Related Art:

A magnetic recording and reproducing apparatus called "R-DAT" has heretofore been known which is arranged to record and reproduce a digital audio signal on and from a magnetic tape by using a rotary head. In the R-DAT, the magnetic tape is made to travel with the magnetic tape obliquely wrapped around a rotary drum provided with the rotary head, thereby recording the digital audio signal on each track while forming the track in the state of being inclined by a predetermined angle with respect to the length of the magnetic tape. During reproduction, the magnetic tape is made to travel so that the rotary head traces each track formed in the above-described manner to reproduce the digital audio signal recorded on the track.

In such an R-DAT, during recording, plural kinds of tracking signals each having a different frequency (hereinafter referred to as "ATF signal(s)") are recorded between adjacent tracks. During reproduction, tracking control is performed for controlling the travel speed of the magnetic tape (hereinafter referred to as "tape speed") so that the rotary head can accurately trace each track on the basis of the reproduction output level of each of the ATF signals.

In the R-DAT, to achieve the above-described tracking control, it is necessary to record and reproduce plural kinds (for example, four kinds) of ATF signals specially prepared for tracking and each having a different frequency. For this reason, the R-DAT involves a number of problems, such as the problem that since a complicated control circuit for tracking is needed and a highly accurate tape travel is required, it is impossible to enhance recording density. To cope with the problems, an apparatus has recently been proposed which employs a so-called nontracking method for restoring reproduced digital data on a memory circuit without the use of the aforesaid tracking ATF signal or other similar signals.

In the nontracking method, after reproduced digital data have been written into the memory circuit, track addresses contained in the respective digital data and block addresses assigned to blocks formed by dividing each track are used to rearrange the digital data within the memory circuit, thereby restoring the original data.

The restored data are read out from the memory circuit at a predetermined speed and converted into an analog signal by a D/A converter, and the analog signal is outputted. According to the above-described nontracking method, it is not necessary to perform extremely accurate tracking control using the aforesaid ATF signal, and even if comparatively rough tracking control is performed, it is possible to reliably reproduce the data.

However, in the above-described nontracking method, since the tracking control is comparatively rough, the rotary head occasionally traverses a plurality of tracks during one trace. Each time the traversing travel occurs, the rotary head performs a different pattern of tracing motion and a large amount of reproduced data is supplied to the memory circuit. Accordingly, the memory circuit needs to have a large capacity which can cope with any pattern of the tracing motion of the rotary head and which makes it possible to stably restore data at any time.

In the nontracking method, reproduced data are read out from the memory circuit at a predetermined speed, but the tape speed occasionally varies to some extent irrespective of the predetermined reading speed. As a result, in the case of long-time reproduction, if the tape speed becomes excessively fast, the speed at which the reproduced data are supplied to the memory circuit becomes correspondingly fast, so that the memory circuit becomes full and part of the written data may be lost. In contrast, if the tape speed becomes excessively slow, a delay occurs in the supply of reproduced data to the memory circuit, so that the memory circuit may become empty. In either case, it is necessary to execute correction of the reproduced data.

SUMMARY OF THE INVENTION

An object of the present invention which has been made in the light of the above-described problems is to provide a novel reproducing apparatus capable of executing accurate tracking control without the need to record a tracking signal on a recording medium.

Another object of the present invention is to provide a novel tracking method which utterly differs from any conventional tracking method.

To achieve the above objects, in accordance with one aspect of the present invention, there is provided a reproducing apparatus which comprises reproducing means for reproducing data recorded on a recording medium in a predetermined pattern, memory means for storing data obtained from the reproducing means, and controlling means for controlling the reproducing means on the basis of a state of reproduction of the data stored in the memory means.

To achieve the above objects, in accordance with another aspect of the present invention, there is provided a controlling method suitable for use in a reproducing apparatus arranged to reproduce digital data recorded on a recording medium in the form of predetermined units and restore the digital data on a memory circuit in the form of the predetermined units, wherein a travel speed of the recording medium is variably controlled according to a state of reproduction of the reproduced digital data on the memory circuit.

According to either of the above aspects of the present invention, it is possible to realize accurate tracking control on the basis of the state of reproduction on a memory.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 1 is a block diagram schematically showing the arrangement of a reproducing apparatus according to one embodiment of the present invention;

FIGS. 4(A) to 4(C) are schematic views respectively showing the arrangements of data reproduced by the individual traces shown in FIG. 3, FIG. 4(D) is a schematic view showing a data arrangement obtained by integrating part of the data of FIGS. 4(A) to 4(C) on a memory;

FIGS. 5(A) to 5(C) are schematic views showing the arrangement of a memory circuit and the manner of shift of data;

FIGS. 13(A) and 13(B) are schematic views respectively showing a storage pattern and a distribution pattern of state-of-reproduction data both of which appear on a first memory according to the embodiment shown in FIG. 12;

DETAILED DESCRIPTION OF THE PREFERRED EMBODIMENTS

Figure 2:
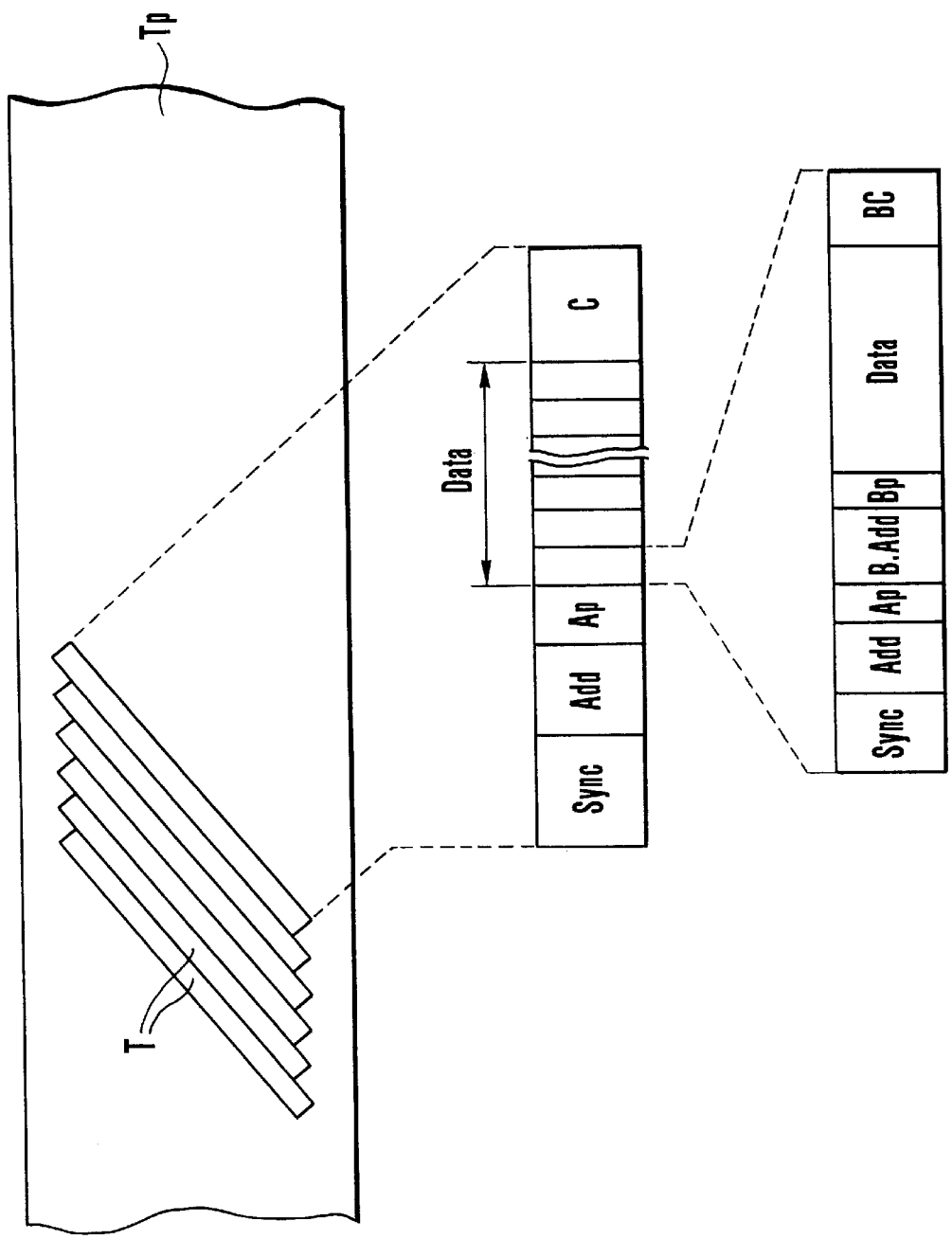
FIG. 2 is a schematic view showing the arrangement of a recording format for a magnetic tape.

Preferred embodiments of the present invention will be described below with reference to the accompanying drawings.

In the following description of each of the preferred embodiments of the present invention, reference will be made to a nontracking method arranged to reproduce digital data by tracing each track on a magnetic tape without performing accurate tracking control, integrate the reproduced digital data within a memory circuit to produce restored digital data, and sequentially output the restored digital data on a track-by-track basis. Each of the preferred embodiments is particularly related to an input part of the memory circuit.

FIG. 1 is a block diagram schematically showing the arrangement of a reproducing apparatus according to one embodiment of the present invention.

Referring to FIG. 1, a pair of magnetic heads He1 and He2 which are spaced apart from each other at an angular interval of 180° are mounted on a rotary drum 1, and a magnetic tape Tp is wrapped around the rotary drum 1 over an angular extent of approximately 100°. Digital data are recorded or reproduced by causing the rotary drum 1 to rotate at a predetermined speed while causing the magnetic tape Tp to travel by means of a capstan 4 at a predetermined speed.

The rotary drum 1 is rotationally controlled by a drum motor driving circuit 3 controlled by a system controller 2. The system controller 2 has a microcomputer, and generates a control signal for general speed control and a control signal for phase control on the basis of a PG pulse and an FG pulse obtained in synchronism with the rotation of the rotary drum 1 and supplies these control signals to the drum motor driving circuit 3. The capstan 4 is rotationally controlled by a capstan motor driving circuit 5.

As shown in FIG. 2, a plurality of tracks T are formed on the magnetic tape Tp in the state of being inclined by a predetermined angle with respect to the length of the magnetic tape Tp. On each of the tracks T, are recorded a synchronizing signal (Sync), a track address (Add), an address parity part (Ap), digital data grouped into a plurality of blocks, and a correction code (C). On each of the blocks, a synchronizing signal (Sync), a track address (Add), an address parity part (Ap), a block address (B.Add), a block address parity part (Bp), block data (Data), and a correction code (BC).

Referring back to FIG. 1, data reproduced by the magnetic heads He1 and He2 are amplified by an amplifier 6, and the amplified data are applied to a clock signal generating circuit 10. The clock signal generating circuit 10 generates a bit clock signal and a word clock signal on the basis of the applied reproduced data. Each of the generated clock signals is supplied to an associated, predetermined circuit. The reproduced data outputted from the amplifier 6 are also applied to a data separating circuit 7, where data and an associated correction code are separated from the reproduced data. The data and the associated correction code are supplied to and latched by a latch circuit 8 on a block-by-block basis. An error rate detecting circuit 9 detects the error rate of the latched data within one block, and if the detected error rate is within a predetermined value, the latch circuit 8 transmits the data to a memory circuit 15 which will be described later. The operation of the latch circuit 8 is controlled by the system controller 2 and a memory controlling circuit 12.

The reproduced data outputted from the amplifier 6 are also supplied to an address separating circuit 13, where a track address and a block address are separated from the reproduced data. The separated track and block addresses are supplied to each of the memory controlling circuit 12 and a state-of-reproduction detecting circuit 14. The memory controlling circuit 12 supplies the data for one block latched in the latch circuit 8 to an integration area 15A of the memory circuit 15, on the basis of the separated track and block addresses.

As shown in FIG. 1, the memory circuit 15 has a memory area formed by three areas: the integration area 15A, a correction and interpolation area 15B and a read-out area 15C. The integration area 15A, the correction and interpolation area 15B and the read-out area 15C have a 20-step memory part, a 4-step memory part and a 6-step memory part in their initial states, respectively. Each step of each of these areas has a capacity for storing data for one track, and each of the areas is arranged so that a shift of data between adjacent steps can be executed.

The integration area 15A is an area in which the reproduced data are classified into data for individual tracks in accordance with the corresponding track addresses and the classified data are rearranged within each track in accordance with the corresponding block addresses. The supplied data are restored into data for each track within the integration area 15A.

Figure 3:
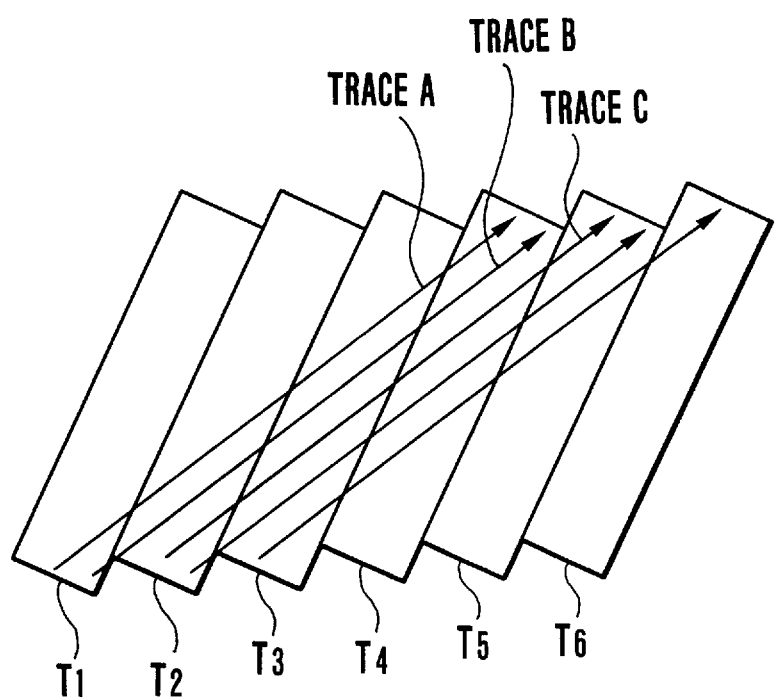
FIG. 3 is an explanatory view showing the relationship between a plurality of tracks and individual traces executed by a magnetic head.

More specifically, in the above-described embodiment, during reproduction, since accurate tracking control is not performed, trace loci A, B and C each formed by one trace may traverse some of a plurality of tracks T1 to T6 as shown in FIG. 3. In this case, reproduced data obtained along each of the trace loci A, B and C include data for a plurality of tracks, as shown in FIGS. 4(A) to 4(C). For this reason, in the above-described embodiment, as shown in FIG. 4(D), the reproduced data are classified into data for the respective tracks on the basis of the associated track addresses, and the classified data are rearranged so that they occupy their predetermined positions within the corresponding track. In this manner, the data for each track are restored to some extent.

The correction and interpolation area 15B is an area in which error correction is performed for each track by using the correction codes contained in the track and the associated blocks and interpolation of unreproduced data is also performed, by means of correction and interpolation executed by a correction and interpolation circuit 16.

The read-out area 15C is an area which is used for accurately reading out at a predetermined timing the corrected or interpolated data for each track on a track-by-track basis. The data read out from the read-out area 15C is converted into an analog signal by a D/A (analog-to-digital) converter 17 and the analog signal is outputted from the D/A converter 17. The data read out from the read-out area 15C is also outputted through an interface circuit 18 in digital form.

The integration area 15A, the correction and interpolation area 15B and the read-out area 15C of the memory circuit 15 are independently controlled by the memory controlling circuit 12. More specifically, the storage address of each data in the memory circuit 15 is determined in accordance with a track address and a block address corresponding to the track address, and the position of each track address in the memory circuit 15 is sequentially shifted in an upward direction (toward an output side) at predetermined timing under control of the memory controlling circuit 12.

For example, the position on the memory circuit 15 of a track address corresponding to an n-th track is initially assigned to the lowermost step in the integration area 15A of the memory circuit 15 as shown in FIG. 5(A). When reproducing data from the magnetic tape Tp, the position of the track address is sequentially shifted in the upward direction, and when data for a certain number of tracks are reproduced, the reproduced data are shifted by of one track into the correction and interpolation area 15B as shown in FIG. 5(B). After the shifted data have been subjected to correction and interpolation by the correction and interpolation area 15B, the resultant data are shifted into the-read-out area 15C as shown in FIG. 5(C). Finally, the data are sequentially read out from the read-out area 15C on a track-by-track basis. This read-out operation is performed at a timing corresponding to a predetermined period (for example, 1/60 second).

The shown apparatus also includes a memory 19, such as a RAM, which is used by the state-of-reproduction detecting circuit 14 during its operation, various operating buttons 21 such as a reproduction button, and a display button 22.

The state-of-reproduction detecting circuit 14 executes capstan control as well as control of the degree of allowance (which will be described later) of the memory capacity of the integration area 15A with respect to each block, on the basis of each address data supplied from the address separating circuit 13. The capstan control is executed in such a manner that control of the tape speed is executed so that address data associated with, for example, data obtained by one trace, can be completely accommodated in the integration area 15A of the memory circuit 15.

In the control of the degree of allowance, the memory arrangement of the integration area 15A is altered so that the degree of allowance relative to the direction of track address in each block in the memory circuit 15 (in this case, the number of remaining steps arranged in the direction of track address in each block) can be prevented from varying among the individual blocks, thereby preventing data from being lost even if the position of trace by a reproducing head (the magnetic head He1or He2) does not strictly coincide with the position of a desired track on the magnetic tape Tp to be traced by the reproducing head.

Figure 6A:
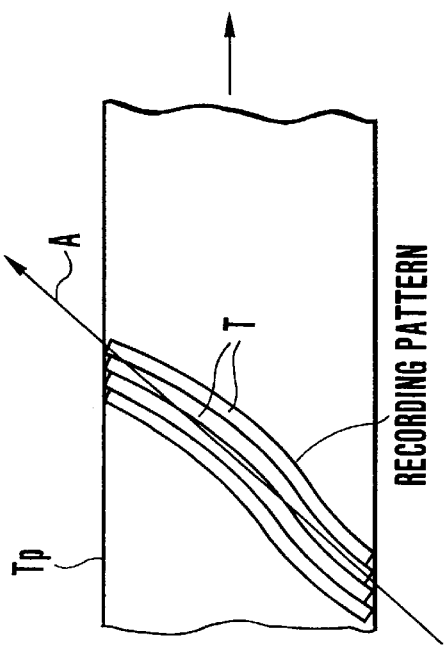
FIGS. 6(A) to 6(D) are schematic views showing the relationships between various track recording patterns and various trace loci.
Figure 6B:
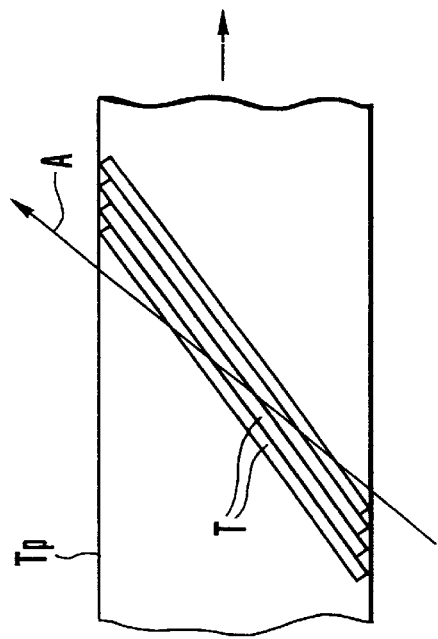
Figure 6C:
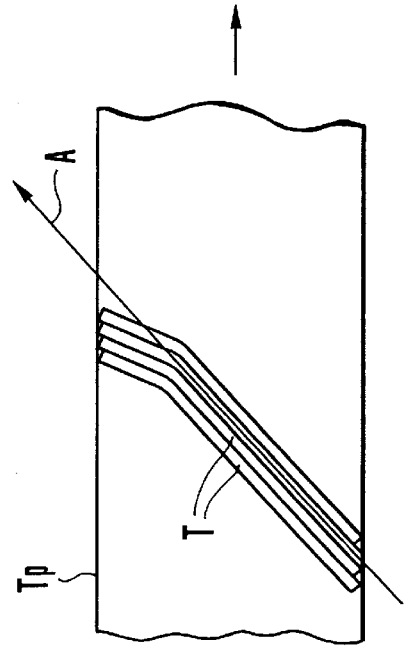
Figure 6D:
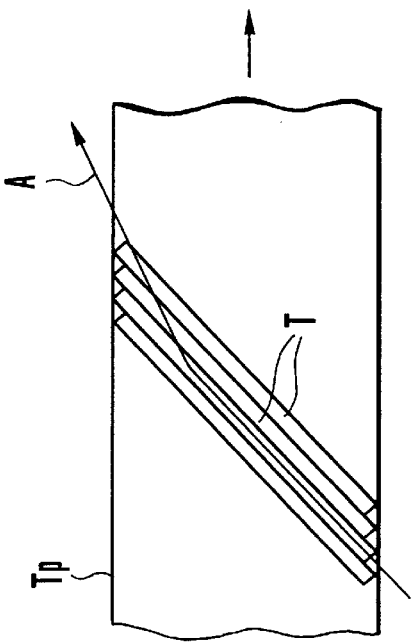

The control of the degree of allowance will be described below with reference to FIGS. 6(A) to 6(D) and 7(A) to 7(C). FIGS. 6(A) to 6(D) show the recording patterns of several tracks T and the locus A of the reproducing head. As shown, the recording patterns undergo an angular variation, a wave-shaped, irregular deformation and the like, while the locus A undergoes a variation due to a variation of the tape speed or the like. FIG. 6(A) shows a case where although the locus A of the reproducing head partially traverses the recording patterns, the inclination of the locus A and the inclination of the recording patterns substantially coincide with each other as a whole. FIG. 6(B) shows a case where the inclination of the locus A of the reproducing head greatly differs from the inclination of the recording patterns. FIG. 6(C) shows a case where the inclination of the recording patterns greatly varies at an intermediate position. FIG. 6(D) shows a case where the locus A of the reproducing head greatly varies at an intermediate position.

Figure 7A:
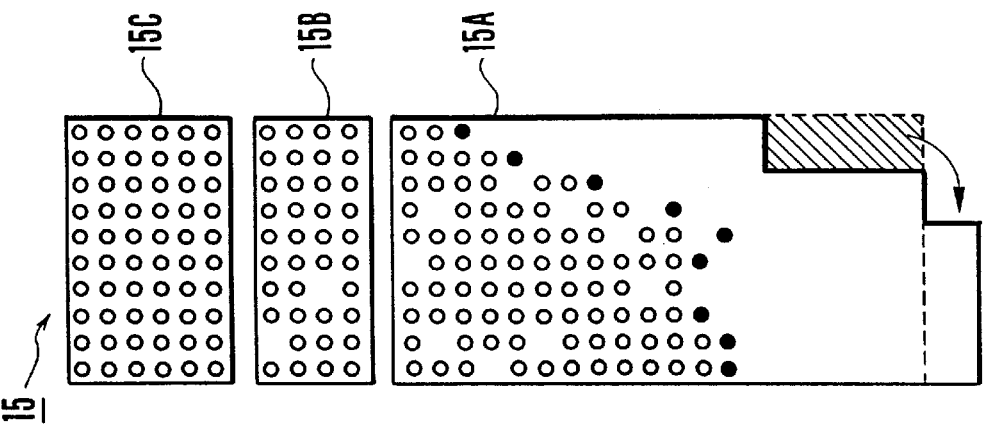
FIGS. 7(A) to 7(C) are schematic views showing the states of data storage which correspond to the respective relationships shown in FIGS. 6(A) to 6(D)
Figure 7B:
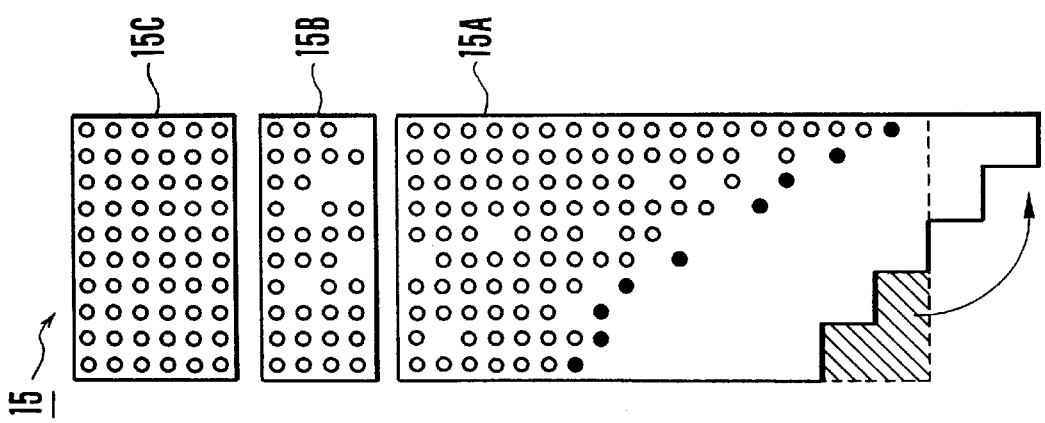
Figure 7C:
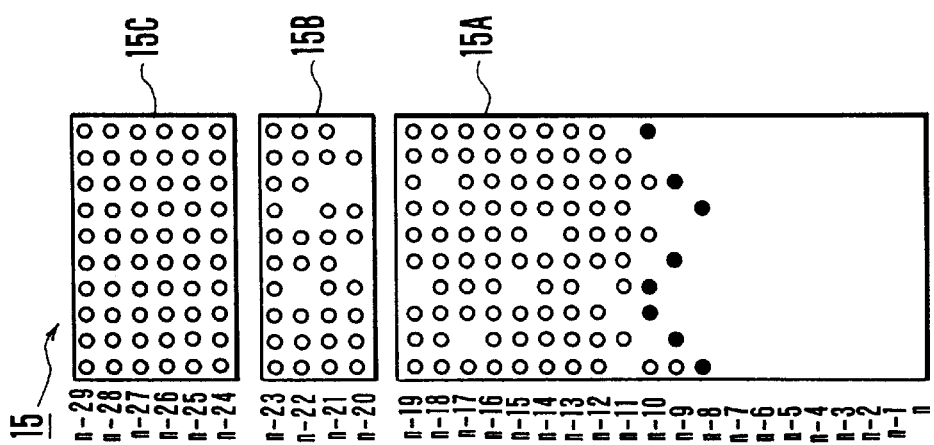

FIGS. 7(A) to 7(C) respectively show the states of data stored in the memory circuit 15 which correspond to FIGS. 6(A), 6(B), 6(C) and 6(D). Each black dot within the integration area 15A, shown in FIGS. 7(A) to 7(C), represents a block which contains data corresponding to the latest trace from among the data obtained through the tracing operation of the magnetic head He1 or He2. Each white dot within the integration area 15A and the correction and interpolation area 15B represents a block which contains data obtained through previous tracking operations. Each white dot within the read-out area 15C represents a block which contains data subjected to correction and interpolation. As shown, in the above-described embodiment, one track is divided into ten blocks.

In the case of the recording patterns and the locus A shown in FIG. 6(A), new data are inputted into each track address and block address of the integration area 15A as shown in FIG. 7(A). The track address of each block obtained through the trace of the magnetic heads He1 and He2 is accommodated within the range of three track addresses respectively indicated by a step n-8, a step n-9 and a step n-10. The difference between the numbers of remaining steps leading to a step n in the respective blocks is a maximum of three steps. In this case, it is determined that the recording patterns substantially coincide with the locus A of the reproducing head, and the process waits for the next data without altering the memory arrangement of the integration area 15A.

If recording and reproduction are performed by different apparatus, the inclination of the locus A of the reproducing head occasionally differs from the inclination of the recording patterns as shown in FIG. 6(B). In this case, the state of data inputted into the integration area 15A of the memory circuit 15 is as shown in FIG. 7(B).

If the memory arrangement of the integration area 15A remains rectangular as shown by a dotted line in FIG. 7(B), the number of remaining steps usable for memory, which are relative to a block having a smaller block address (shown on the left side in FIG. 7(B)), greatly differs from the number of remaining steps usable for memory which are relative to a block having a greater block address (shown on the right side in FIG. 7(B)). In this example, the number of remaining steps usable for memory on the right side is the smallest. If further data are read out and the entire data are shifted by one step upwardly in the direction of track address, the degree of allowance of the memory capacity in the area of the right-side block is the smallest.

Accordingly, it is very possible that, in the area of the right-side block, there is no place in which data obtained by the next trace of the reproducing head is to be accommodated, with the result that the possibility of loss of data is high. For this reason, on the basis of each address data supplied to the state-of-reproduction detecting circuit 14, the memory arrangement of the integration area 15A is altered and preparation for the next data to be inputted is performed so that the difference in the number of remaining steps usable for memory between the areas of the respective blocks can be reduced.

In the example shown in FIG. 7(B), a memory portion corresponding to smaller block addresses, that is, the memory portion shown as a hatched area in the integration area 15A of FIG. 7(B), is moved to an area corresponding to larger block addresses as indicated by an arrow, thereby adjusting the memory arrangement of the integration area 15A. In general, if recording is continuously performed, it can be determined that the recording patterns of tracks close to each other do not undergo a great angular variation, a severe wave-shaped, irregular deformation or the like. Accordingly, by altering the memory arrangement of the integration area 15A, it is possible to reduce the probability that data may be erroneously lost because there is no track address area specified for the next data to be inputted into the memory circuit 15, without the need to increase the memory capacity of the memory circuit 15.

FIGS. 6(C) and 6(D) respectively show the case where the inclination of the recording patterns varies at an intermediate position and the case where the locus A of the reproducing head varies at an intermediate position. In either case, the state of data inputted into the integration area 15A of the memory circuit 15 is as shown in FIG. 7(C). Accordingly, it is possible to reduce the probability of loss of the next data to be inputted, by moving the right-side memory portion shown as a hatched area in the integration area 15A of FIG. 7(C) toward the left side, as indicated by an arrow, and adjusting the memory arrangement of the integration area 15A.

Figure 8:
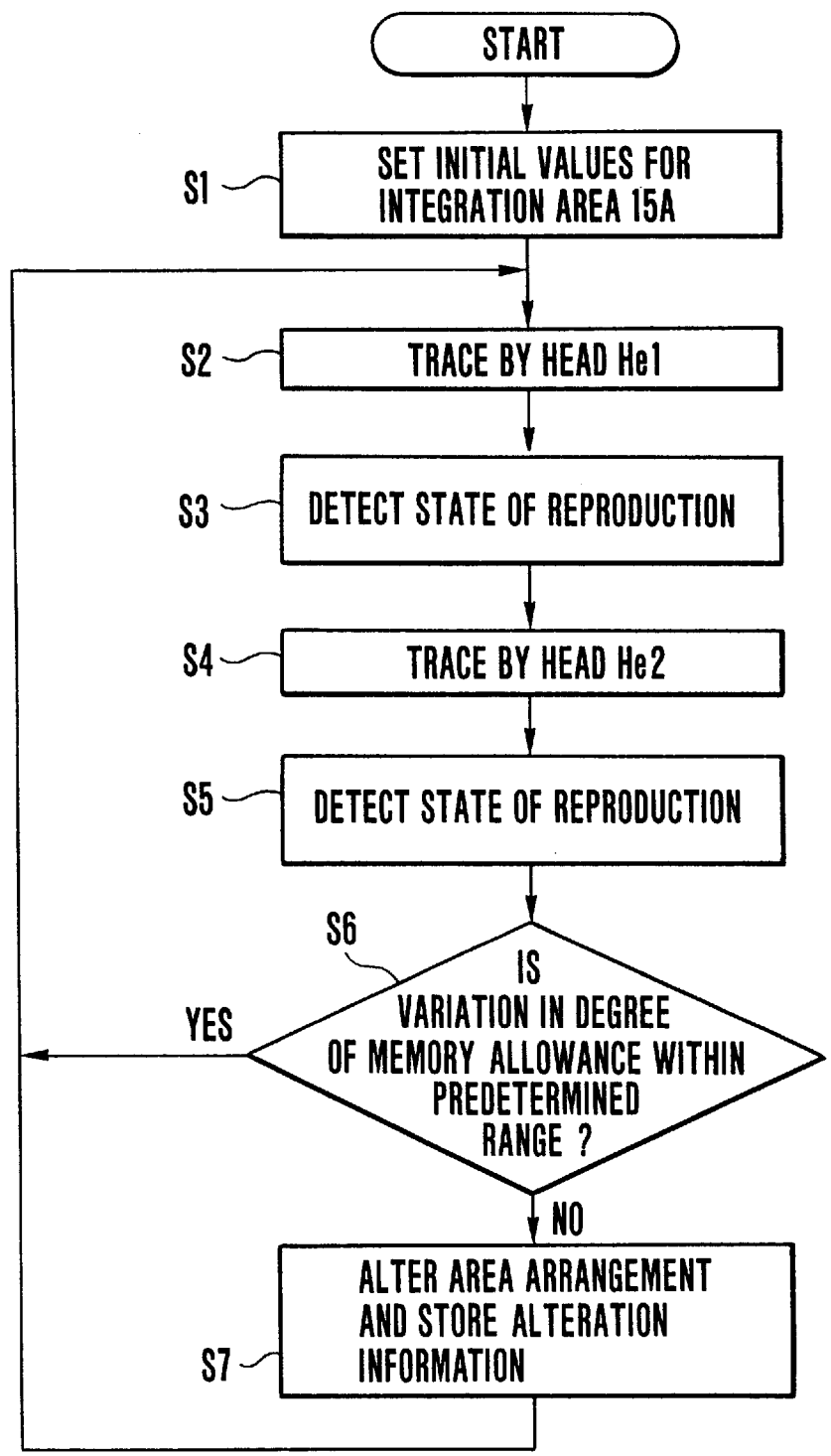
FIG. 8 is a flowchart showing an operation according to the embodiment shown in FIG. 1.

The operation of altering the memory arrangement of the integration area 15A will be described below with reference to the flowchart of FIG. 8.

In Step S1, initial setting is performed so that the number of steps usable for memory for each block in the integration area 15A can be made equal. In Step S2, the magnetic head He1 is made to perform a tracing operation, and addresses and data are separated from the data reproduced by the magnetic head He1. The address data are supplied to the state-of-reproduction detecting circuit 14. In Step S3, a track number and a block number which constitute the address information reproduced by the magnetic head He1 are stored in the memory 19. The data are latched by the latch circuit 8 on a block-by-block basis, and if the error rate of the latched data within one block is lower than the predetermined value, the latched data are sequentially stored in the integration area 15A of the memory circuit 15 specified by the memory controlling circuit 12.

In Steps S4 and S5, processings similar to that executed in Steps S2 and S3 is performed on the data reproduced by the magnetic head He2. In Step S6, a comparison is made between the degrees of allowance of the memory capacity of the integration area 15A with respect to each block on the basis of the address information obtained in Steps S3 and S5. If the extent of variation in the degrees of allowance of the memory capacities of all the blocks is accommodated within a predetermined range, the process returns to Step S1 without altering the memory arrangement of the integration area 15A.

If the extent of variation in the degrees of allowance of the memory capacities of all the blocks exceeds the predetermined range, the process proceeds to Step S7, wherein the memory arrangement of the integration area 15A is altered. The altered state of the memory arrangement is memorized so that it can be utilized for the next comparison to be made between the degrees of allowance of the memory capacities, which comparison is performed during the next input cycle started with Step S1.

Another embodiment of the present invention will be described below.

One function of a recording and reproducing apparatus using a magnetic tape is to reproduce part of recorded data while transporting the magnetic tape in a forward or backward direction at a tape speed several to several hundred times as fast as the tape speed at which recording was performed.

In this case, since the tape speed is known information usable for the system controller 2, the memory arrangement of the integration area 15A is altered on the basis of the tape speed so that much more data can be reproduced or so that the probability of reproduction of data contained in a particular block can be made as high as possible by attaching importance to the data.

Another embodiment of the present invention will be described in detail below with reference to FIGS. 9 through 11.

Figure 9:
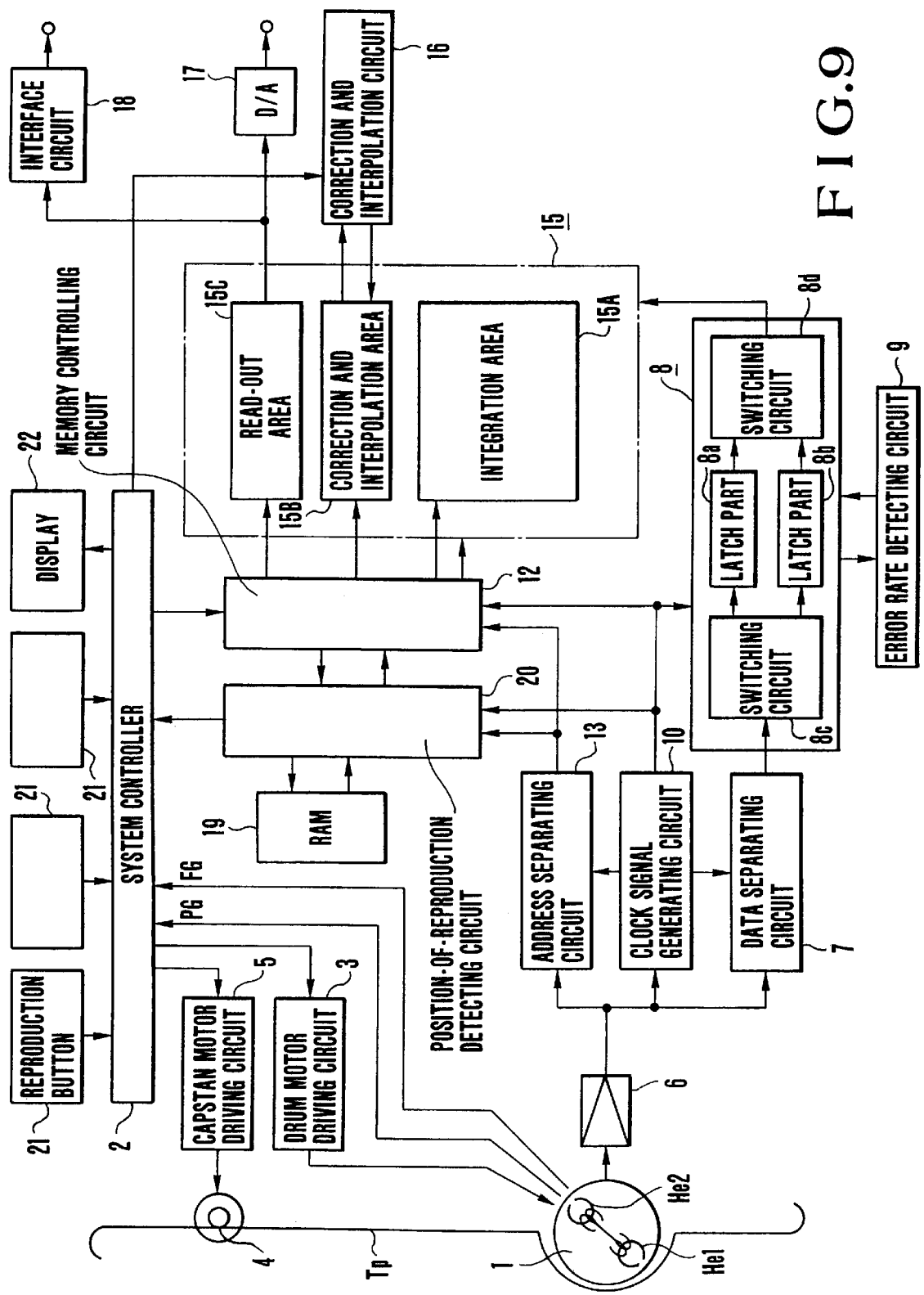
FIG. 9 is a block diagram schematically showing the arrangement of a reproducing apparatus according to another embodiment of the present invention.
Figure 10:
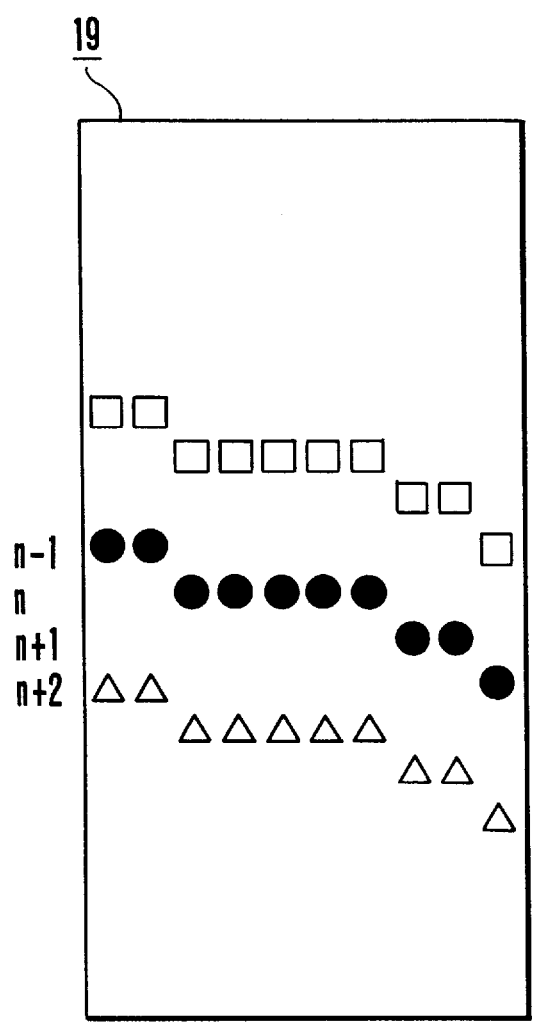
FIG. 10 is a schematic view showing the distribution on a memory of flags corresponding to address information.
Figure 11:
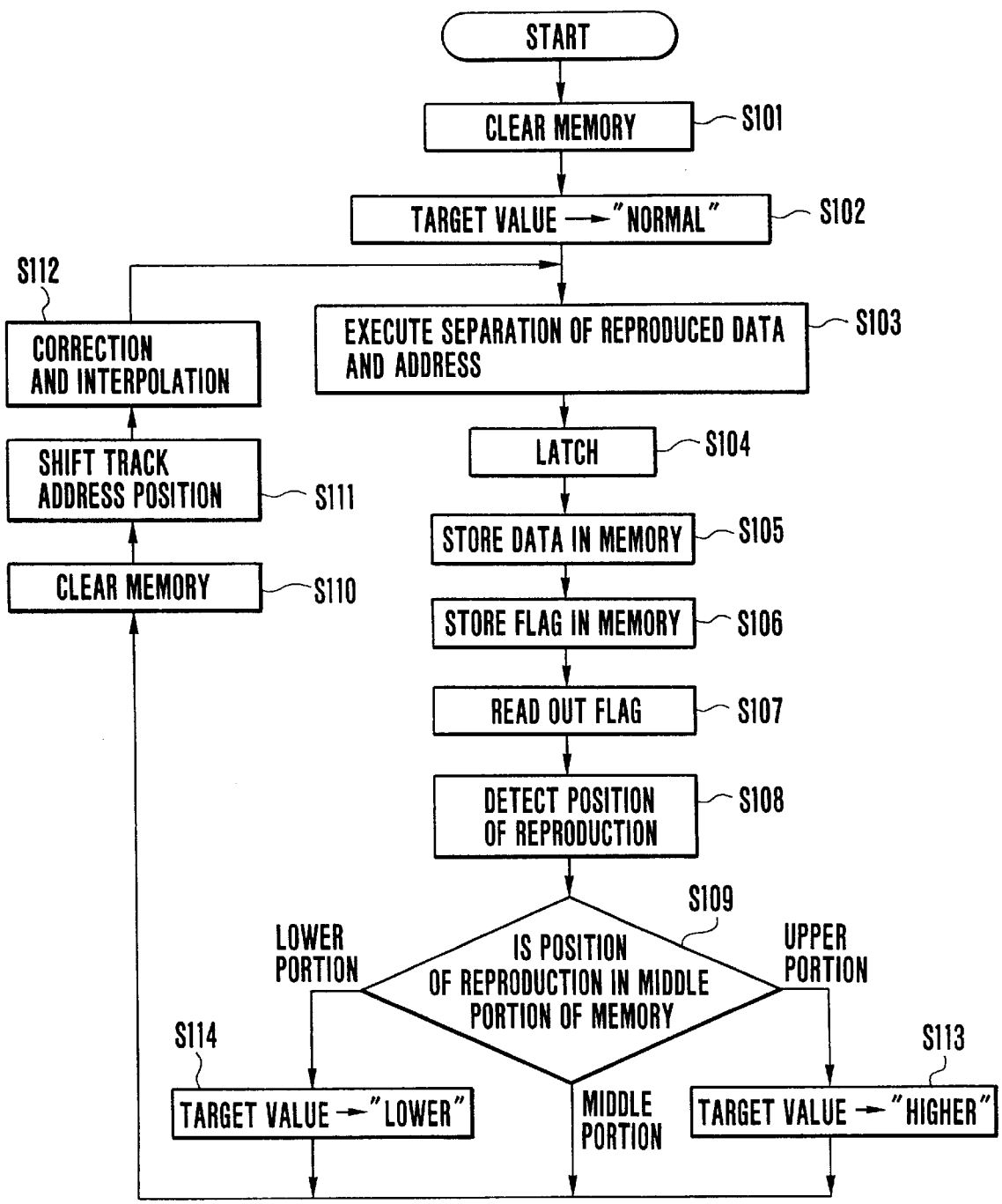
FIG. 11 is a flowchart showing an operation according to the embodiment shown in FIG. 9.

The embodiment shown in FIGS. 9 through 11 is arranged to control the tape speed so that data for each track are completely arranged in the read-out area 15C by a time when actual reading from the read-out area 15C of the memory circuit 15 is started.

FIG. 9 is a block diagram schematically showing the arrangement of the embodiment. In FIG. 9, the same reference numerals are used to denote elements similar to those shown in FIG. 1. The arrangement shown in FIG. 9 differs from that shown in FIG. 1 in the following respects. The state-of-reproduction detecting circuit 14 of FIG. 1 is replaced with a position-of-reproduction detecting circuit 20, and the latch circuit 8 is arranged to latch data obtainable by one trace of the reproducing head at a time.

Referring to FIG. 9, reproduced data, which are amplified by the amplifier 6, are applied to the data separating circuit 7, where data and an associated correction code are separated from the reproduced data. The data and the associated correction code are supplied to the latch circuit 8 on a trace-by-trace basis. The latch circuit 8 is made up of two latch parts 8a and 8b each of which latches data for one trace. The data for one trace supplied to the latch circuit 8 are supplied to either of the latch parts 8a and 8b by a switching circuit 8c, and the supplied data are latched by the latch part 8a or 8b. During this time, each time data for one trace are supplied to the latch circuit 8, the switching circuit 8c switches to alternately supply the data to the latch parts 8a and 8b.

The reproduced data outputted from the amplifier 6 are also supplied to the address separating circuit 13, where a track address and a block address are separated from the reproduced data. The separated track and block addresses are supplied to the memory controlling circuit 12 and the position-of-reproduction detecting circuit 20. The memory controlling circuit 12 causes the latch part 8a or 8b to output the data for one trace which have been latched therein, on the basis of the separated track and block addresses. The data for one trace which have been outputted from the latch part 8a or 8b are supplied to the memory circuit 15 through a switching circuit 8d. During this operation, the memory controlling circuit 12 provides control so that the latch parts 8a and 8b alternately output data for one trace at intervals of one track period.

The position-of-reproduction detecting circuit 20 is provided with the memory (RAM) 19 having an address arrangement similar to that of the integration area 15A of the memory circuit 15. The memory (RAM) 19 is arranged in such a manner that when address data is reproduced, a flag is set at an address position on the memory 19 which corresponds to the address data. The position on the magnetic tape Tp which has been traced by the reproducing head, that is, the position of reproduction, is detected on the basis of the flag.

Data indicative of the position of reproduction which has been detected in the above-described manner is supplied to the system controller 2 from the position-of-reproduction detecting circuit 20. The system controller 2 sets a target value of the tape speed in accordance with the supplied data indicative of the position of reproduction.

In the above-described embodiment, the tape speed is controlled so that the data indicative of the position of reproduction can be located in the middle of the memory 19 as indicated by black dots in the memory 19 shown in FIG. 10. For example, if the data indicative of the position of reproduction are located on an upper side (output side) of the memory 19 as indicated by symbols "□" in FIG. 10, the memory controlling circuit 12 determines that the memory capacity of the memory circuit 15 has a certain degree of allowance, and sets the target value of capstan control to a higher value so that the tape speed can be increased. In contrast, if the data indicative of the position of reproduction are located on a lower side (input side) of the memory 19 as indicated by symbols "Δ" in FIG. 10, the system controller 2 determines that the memory capacity of the memory circuit 15 has no allowance, and sets the target value of capstan control to a lower value so that the tape speed can be decreased.

In the above-described embodiment, each time one trace is performed, the memory 19 is rewritten so that the contents of the memory 19 can always indicate the latest position of reproduction. In the above-described embodiment, the shift of data in the memory circuit 15 is performed in synchronism with the timing at which reading from the read-out area 15C is performed.

The operation of the aforesaid tape-speed control will be described below with reference to the flowchart of FIG. 11.

Initially, when a reproducing operation is started, the contents of each of the memory circuit 15 and the memory 19 are cleared (Step S101), and the target value of the tape speed is set to "normal" (Step S102). During this state, data, an address and the like are separated from a reproduction output of the reproducing head (Step S103). After the separated data have been latched by the latch circuit 8 (Step S104), the latched data are read out from the latch circuit 8 in synchronism with the operation of specifying a memory address on the basis of the separated address, and are then written into the memory circuit 15 (Step S105). Then, flags are generated and written into the memory 19 (Step S106).

Then, the flags are read out from the memory 19 (Step S107), and the position of reproduction is detected from the flag data (Step S108). Then, it is determined from the result of the detection which of the middle, the upper side and the lower side of the memory 19 corresponds to the position of reproduction (Step S109). If the data indicative of the position of reproduction are located in the middle of the memory 19, the tape speed is not changed and the contents of the memory 19 are cleared (Step S110), and each track address position in the memory circuit 15 is shifted in the upward direction by one step (Step S111). Then, the data outputted from the memory circuit 15 is subjected to correction and interpolation (Step S112), and the process returns to Step S103.

If the data indicative of the position of reproduction are located on the upper side of the memory 19, the target value is set to a higher value so that the tape speed can be increased (Step S113), and the process returns to Step S110. If the data indicative of the position of reproduction are located on the lower side of the memory 19, the target value is set to a lower value so that the tape speed can be decreased (Step S114), and the process returns to Step S110.

As is apparent from the above description, according to the embodiment shown in FIGS. 9 through 11, since the tape speed is controlled in correspondence with a position on the memory 19 at which the latest reproduced data obtained by one trace is located, an appropriate amount of data is held in the memory circuit 15 at all times so that it is possible to prevent the memory circuit 15 from becoming full or empty.

In the above-described embodiment, capstan control is performed so that the data indicative of the position of reproduction can be located in the middle of the memory 19, on the basis of reproduced data obtained by one trace. However, the capstan control may be performed on the basis of the number of remaining steps, that is, the number of steps positioned between a step immediately below the lowermost step of the reproduced data obtained by one trace and the lowermost step of the memory 19.

Otherwise, the capstan control may be performed so that a step n corresponding to the middle position of reproduction can be located at the middle position between steps n−1 and n+2.

Another embodiment of the present invention will be described below.

In the case of reproduction from a magnetic tape on which recording is performed in guard-bandless form from track to track with N azimuth angles (N≧2) being set for a plurality of reproducing heads, a large amount of reproduced data can be obtained from a track recorded with an azimuth angle equal to that of a reproducing head, by one trace of the reproducing head. However, if there is a track recorded with an azimuth angle different from that of the reproducing head, the amount of reproduced data obtainable from the track by one trace of the reproducing head is limited.

For this reason, if the reproducing head does not traverse a multiplicity of tracks during one trace, the amount of reproduced data may greatly vary, depending on the azimuth angle of a track to be traced. In such a case, not one trace but N traces are executed, and it is possible to achieve far more stable tape-speed control by utilizing the time interval taken to effect the N traces as a time interval for detecting reproduced-block address information from which information for controlling the tape speed is obtained.

According to any of the above-described embodiments, if recorded data is to be reproduced by the nontracking method, a memory capacity assigned to each of blocks which are formed in the direction of head trace is adjusted according to the state of storage of reproduced data. Accordingly, it is possible to stably reproduce digital data with a reduced memory capacity.

In addition, since the memory arrangement of the memory circuit 15 is altered according to the set speed of each recording medium, even if a magnetic tape is transported in a forward or backward direction at a tape speed several to several hundred times as fast as the tape speed at which recording was performed, it is possible to optimize the amount of memory required for each block. Accordingly, it is possible to reproduce much more data or particular data.

In addition, since speed control of a recording medium is performed on the basis of address information, it is possible to always usefully employ the memory circuit 15 so that it is possible to obtain a stable reproduced signal even in the case of long-time continuous reproduction.

In addition, address information is obtained during the time interval in which all of a plurality of magnetic heads trace, and speed control of a recording medium is performed. Accordingly, even if a plurality of magnetic heads each having a different azimuth angle are used, it is possible to reliably detect address information and effect stable, long-time reproduction.

Another embodiment of the present invention will be described in detail below with reference to the associated drawings.

The embodiment which will be described below is arranged in such a manner that digital data reproduced by tracing tracks on a magnetic tape without accurate tracking control are integrated and restored within a memory circuit and the restored data are sequentially outputted on a track-by-track basis. In the embodiment, the present invention is applied to an arrangement in which the tape speed is controlled so that data for each track are completely arranged in an output part of the memory circuit by a time when actual reading from the memory circuit is started.

Figure 12:
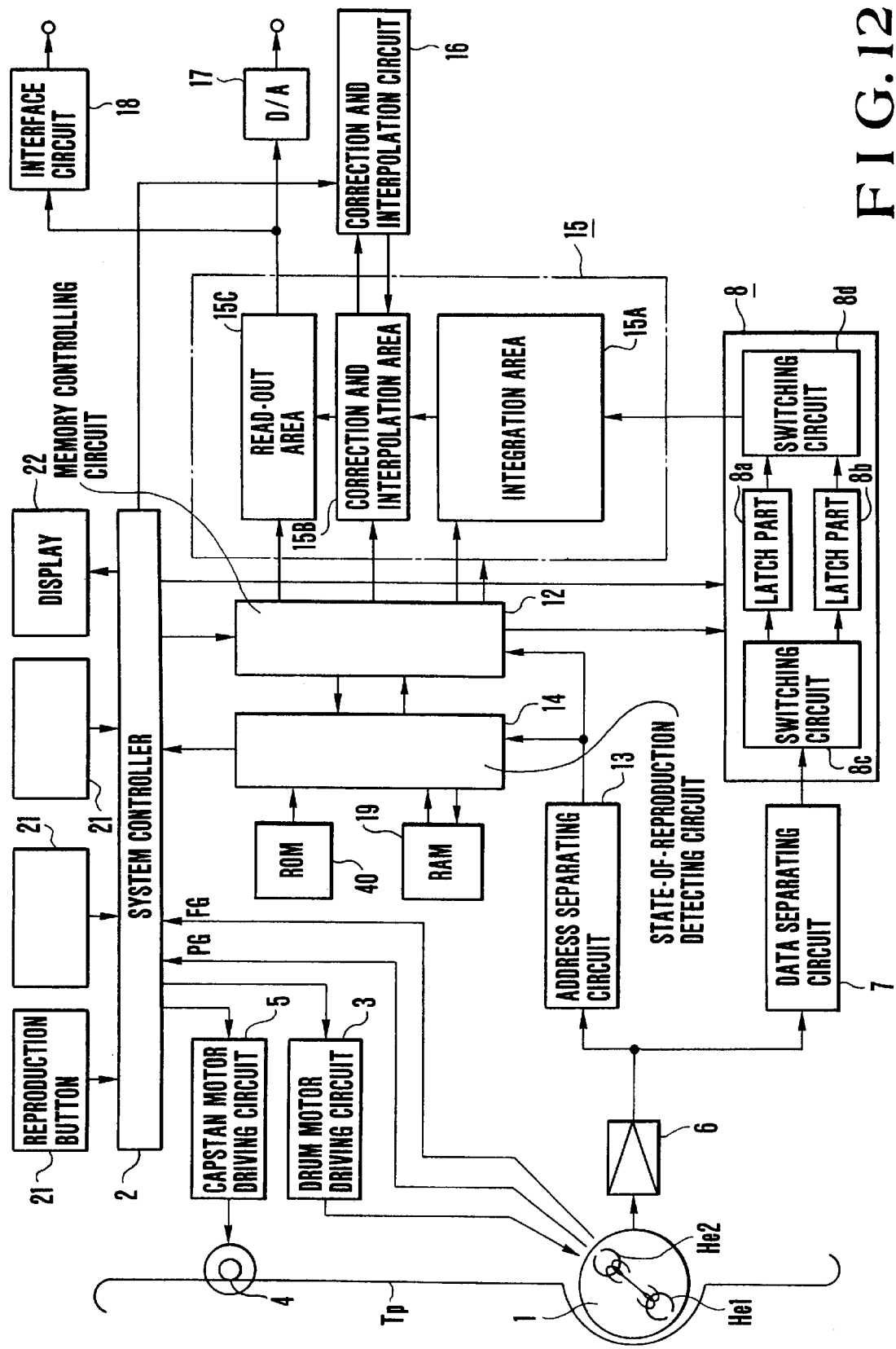
FIG. 12 is a block diagram schematically showing the arrangement of a reproducing apparatus according to another embodiment of the present invention.

FIG. 12 is a block diagram schematically showing the arrangement of the embodiment.

Referring to the embodiment shown in FIG. 12, a pair of magnetic heads He1 and He2 which are spaced apart from each other at an angular interval of 180° are mounted on the rotary drum 1, and the magnetic tape Tp is wrapped around the rotary drum 1 over an angular extent of approximately 100°. Digital data are recorded or reproduced by causing the rotary drum 1 to rotate at a predetermined speed while causing the magnetic tape Tp to travel at a predetermined speed.

The rotary drum 1 is rotationally controlled by the drum motor driving circuit 3 controlled by the system controller 2. The system controller 2 generates a control signal for general speed control and a control signal for phase control on the basis of a PG pulse and an FG pulse obtained in synchronism with the rotation of the rotary drum 1 and supplies these control signals to the drum motor driving circuit 3. The capstan 4 is rotationally controlled by the capstan motor driving circuit 5, and the rotational speed of the capstan 4, that is, the speed of tape travel, is controlled by the system controller 2 in a manner which will be described later.

A plurality of tracks T are formed on the magnetic tape Tp in the state of being inclined by a predetermined angle with respect to the length of the magnetic tape Tp in a manner similar to that described in connection with FIG. 2. On each of the tracks T, are recorded a synchronizing signal (Sync), a track address (Add), an address parity part (Ap), digital data grouped into a plurality of blocks, and a correction code (C). On each of the blocks, a synchronizing signal (Sync), a track address (Add), an address parity part (Ap), a block address (B.Add), a block address parity part (Bp), block data (Data), and a correction code (BC).

Referring back to FIG. 12, data reproduced by the magnetic heads He1 and He2 are amplified by the amplifier 6, and the reproduced data amplified by the amplifier 6 are applied to the data separating circuit 7, where data and an associated correction code are separated from the reproduced data. The data and the associated correction code are supplied to and latched by the latch circuit 8 on a block-by-block basis. The latch circuit 8 is made up of two latch parts 8a and 8b each of which latches data for one trace. The data for one trace supplied to the latch circuit 8 are supplied to either of the latch parts 8a and 8b by the switching circuit 8c, and the supplied data are latched by the latch part 8a or 8b. During this time, each time data for one trace are supplied to the latch circuit 8, the switching circuit 8c switches to alternately supply the data to the latch parts 8a and 8b. The operation of the latch circuit 8 is controlled by the system controller 2 and the memory controlling circuit 12 which will be described later.

The reproduced data outputted from the amplifier 6 are also supplied to the address separating circuit 13, where a track address and a block address are separated from the reproduced data. The separated track and block addresses are supplied to each of the memory controlling circuit 12 and the state-of-reproduction detecting circuit 14. The memory controlling circuit 12 causes the latch part 8a or 8b to output the data for one trace which have been latched therein, on the basis of the separated track and block addresses. The data for one trace which have been outputted from the latch part 8a or 8b are supplied to the memory circuit 15 through the switching circuit 8d. During this operation, the memory controlling circuit 12 provides control so that the latch parts 8a and 8b alternately output data for one trace at intervals of one track period.

As shown in FIG. 12, the memory circuit 15 has a memory area formed by three areas: the integration area 15A, the correction and interpolation area 15B and the read-out area 15C. The integration area 15A, the correction and interpolation area 15B and the read-out area 15C have a 20-step memory part, a 4-step memory part and a 6-step memory part, respectively. Each step of each of these areas has a capacity for storing data for one track, and each of the areas is arranged so that the shift of data between adjacent steps can be executed.

The function and other features of each of the areas is similar to those of the embodiment explained in connection with FIG. 2, and detailed description there is omitted.

The integration area 15A, the correction and interpolation area 15B and the read-out area 15C of the memory circuit 15 are independently controlled by the memory controlling circuit 12. More specifically, the storage address of each data in the memory circuit 15 is determined in accordance with a track address and a block address corresponding to the track address, and the position of each track address in the memory circuit 15 is sequentially shifted in an upward direction (toward an output side) at predetermined timing under control of the memory controlling circuit 12. For example, the position on the memory circuit 15 of a track address corresponding to an n-th track is initially assigned to the lowermost step in the integration area 15A of the memory circuit 15, as in the case of the embodiment explained above in connection with FIG. 5(A). With the travel of the magnetic tape Tp, the position of the track address is sequentially shifted in the upward direction, and when data for a certain number of tracks are reproduced, the reproduced data are shifted in the unit of one track into the correction and interpolation area 15B as shown in FIG. 5(B). After the shifted data have been subjected to correction and interpolation by the correction and interpolation area 15B, the resultant data are shifted into the read-out area 15C as shown in FIG. 5(C). Finally, the data are sequentially read out from the read-out area 15C on a track-by-track basis.

This read-out operation is accurately performed at timing corresponding to a predetermined period (for example, 1/60 second). As will be described later, in this embodiment, the upward shift of data in each of the integration area 15A and the correction and interpolation area 15B is controlled at any time according to the state of reproduction of data.

The control operation of the memory controlling circuit 12 for controlling the aforesaid shift of data executed in the memory circuit 15 is set by the system controller 2 using a microcomputer or the like, and the system controller 2 sets such control operation in accordance with a detection result provided by the state-of-reproduction detecting circuit 14.

The state-of-reproduction detecting circuit 14 detects the state of reproduction of data outputted from the magnetic head He1 or He2, on the basis of each supplied address data. More specifically, as shown in FIG. 13(A), the state-of-reproduction detecting circuit 14 stores data indicative of the presence or absence of each supplied block address in a predetermined position of the corresponding track address (i.e., a block address) within the memory (RAM) 19 which is provided as a first memory, and detects the state of reproduction of data on the basis of the data stored in the first memory 19.

The state-of-reproduction detecting circuit 14 also classifies the detected state of reproduction into three states, i.e., "normal", "fast" and "late", as will be described later. The state-of-reproduction detecting circuit 14 supplies to the system controller 2 a control signal for controlling a target value of the tape speed which corresponds to each of the three states and a control signal for controlling the shift timing at which data are to be shifted in the memory circuit 15. More specifically, the state-of-reproduction detecting circuit 14 is provided with a second memory (ROM) 40 which stores distribution patterns of three kinds, i.e., a "normal pattern", a "fast pattern" and a "late pattern", the target-value data of the tape speed peculiar to each of the distribution patterns, and data relative to the shifting timing of data. The state-of-reproduction detecting circuit 14 makes a comparison between state-of-reproduction data indicative of the state of reproduction detected in the above-described manner and each of the distribution patterns, selects both target-value data corresponding to a distribution pattern closest to the detected state of reproduction and data relative to the corresponding shift timing, and supplies both data to the system controller 2 as control data.

In the first memory 19, rewriting of reproduction data is executed on the basis of block addresses and track addresses (relative addresses) whose respective address positions sequentially vary within the first memory 19 upon data reproduction, as in the case of the track addresses of the memory circuit 15 explained previously in connection with the embodiment shown in FIG. 1. The block and track addresses are employed during reading of newly reproduced data into the first memory 19 or during execution of a shift of the data.

The first memory 19 is also arranged so that data can be read out therefrom on the basis of absolute addresses which are consistently fixed. The absolute addresses are employed during reading of the aforementioned state-of-reproduction data.

Similarly to the first memory 19, the second memory 40 is also arranged so that data can be read out therefrom on the basis of absolute addresses. The absolute addresses are employed during reading of any of the aforementioned distribution patterns.

The absolute addresses are arranged so that each of them specifies a plurality of block addresses as one group, as shown in FIG. 13(B), and the data value of each of groups is determined according to the density of block addresses present in each of the groups. More specifically, in this embodiment, each of the groups is made up of 2×2 blocks (a total of 4 blocks) which are located on two tracks. If a group is completely occupied by 4 blocks, the data value of the group is set to "10". If 3 or 2 blocks are present in the group, the data value is set to "01". If 1 or 0 block is present in the group, the data value is set to "00". In this embodiment, the data values of the respective groups are compared with each other to determine which of the distribution patterns is closest to the state-of-reproduction data.

Although not specifically referred to herein, a general fuzzy theory may be used to determine which of the distribution patterns is closest to the state-of-reproduction data.

The system controller 2 sets and controls the memory operation of shifting the track address positions in the memory circuit 15 and executing reading of data from the read-out area 15C, on the basis of the result of the above-described comparison between the above-described state-of-reproduction data and each of the distribution patterns. The system controller 2 also controls the tape speed on the basis of the target value thereof.

In other words, in this embodiment, upon data reproduction, the track address positions are shifted in the upward direction on a track-by-track basis in each of the read-out area 15C, the correction and interpolation area 15B and the integration area 15A of the first memory 19. During a normal operation, the data within each of the integration area 15A and the correction and interpolation area 15B is sequentially shifted in synchronism with the timing at which data is read out from the read-out area 15C.

In contrast, if the state of integration of data in, for example, the integration area 15A, is late, reading from the read-out area 15C is performed at a predetermined timing, while the shift timing of data in each of the integration area 15A and the correction and interpolation area 15B is delayed to lengthen a time interval for waiting for arrival of reproduced data at the integration area 15A. As a result, the amount of data remaining in the read-out area 15C may decrease. However, in this embodiment, if the amount of data remaining in the read-out area 15C decreases to an amount equivalent to three tracks, data is shifted from the memory circuit 15 to the read-out area 15C in an ordinary manner so that interruption of data output is prevented.

The system controller 2 supplies a tape-speed control signal based on the target value of the tape speed to a capstan motor driving circuit 5 on the basis of the result of the above-described comparison between the above-described state-of-reproduction data and each of the distribution patterns, thereby controlling the tape speed.

Although not specifically referred to herein, various operating keys such as the reproduction button 21 are connected to the system controller 2, and the display part 22 for visually displaying the state of operation is also connected to the same.

Figure 14:
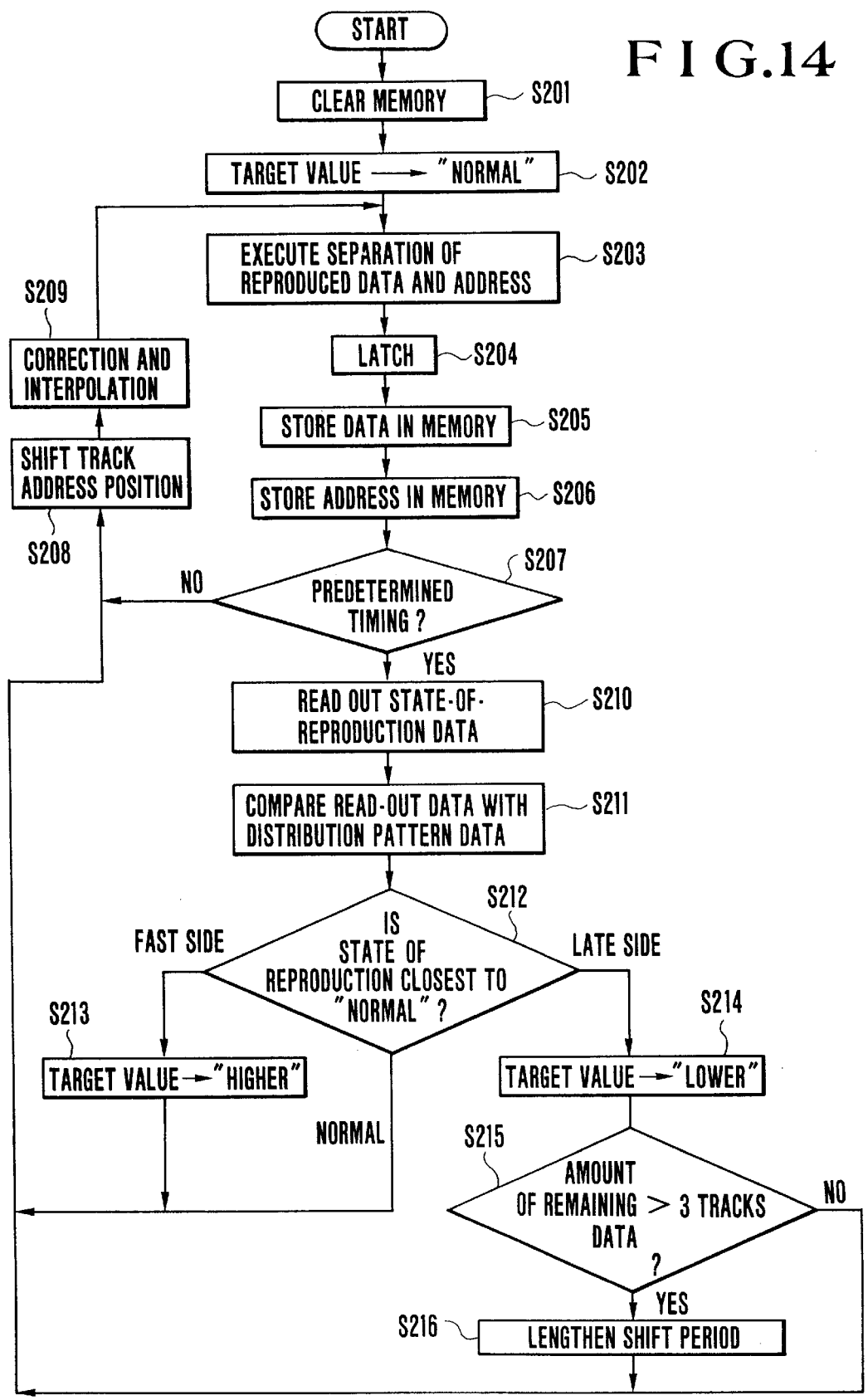
FIG. 14 is a flowchart showing an operation according to the embodiment shown in FIG. 12.

The reproducing operation of the apparatus having the above-described arrangement will be described below with reference to the flowchart shown in FIG. 14.

Initially, when the reproducing operation is started, the contents of each of the memory circuit 15 and the memory 19 are cleared (step S201), and the target value of the tape speed is set to "normal" (Step S202). During this state, data, an address and the like are separated from a reproduction output of the magnetic head He1 or He2 (Step S203). After the separated data have been selectively latched by the latch circuit 8 (Step S204), the latched data are read out from the latch circuit 8 in synchronism with the operation of specifying a memory address on the basis of the separated address, and are then written into the memory circuit 15 (Step S205). In addition, each address is supplied to the state-of-reproduction detecting circuit 14 and is written into the first memory 19 provided in the state-of-reproduction detecting circuit 14 (Step S206).

Then, it is determined whether the elapsed time after the start of the reproducing operation coincides with a predetermined timing (Step S207). If it is determined that the elapsed time does not coincide with the predetermined timing, the track address positions in each of the memory circuit 15 and the first memory 19 are shifted in the upward direction on a step-by-step basis (Step S208), and correction and interpolation of the data are performed (step S209). Then, the process returns to Step S203.

The predetermined timing is determined by counting, for example, the number of PG pulses, and it is assumed in this embodiment that at the instant when the counted number of PG pulses reaches an integer multiple of 3, the aforesaid elapsed time coincides with the predetermined timing.

If it is determined in Step S207 that the elapsed time coincides with the predetermined timing, state-of-reproduction data is read out from the first memory 19 of the state-of-reproduction detecting circuit 14 on the basis of the above-described absolute addresses (Step S210), and the state-of-reproduction data is compared with each of the distribution patterns read out from the second memory 40 on the basis of the absolute addresses (Step S211). It is determined which of the distribution patterns is closest to the state of reproduction from the result of the comparison (Step S212). If it is determined that the state of reproduction is closest to "normal", the process returns to Step S208. If it is determined that the state of reproduction is faster than "normal", the target value of the tape speed is made higher so that the tape speed is increased (Step S213). Then, the process returns to Step S208.

If it is determined that the state of reproduction is later than "normal", the target value of the tape speed is made lower so that the tape speed is decreased (Step S214). Then, it is determined whether the amount of data remaining in the read-out area 15C is not greater than an amount equivalent to three tracks (Step S215). If it is determined that the amount of data remaining in the read-out area 15C is not greater than the amount equivalent to three tracks, the process returns to Step S208. If the amount of remaining data is greater than the amount equivalent to three tracks, the period of shift of data in each of the integration area 15A and the correction and interpolation area 15B is lengthened (Step S216). Accordingly, the time interval for waiting for arrival of reproduced data at the integration area 15A is lengthened, and the degree of data restoration (data integration) in the integration area 15A is enhanced.

In the reproducing apparatus having the above-described arrangement, it is possible to effect reliable reproduction of data even if a magnetic head does not accurately traces each track, particularly during reproduction.

In addition, since the travel speed of a magnetic tape can be controlled on the basis of the state of reproduction of reproduced data, it is not necessary to record a special control signal on the magnetic tape and it is, therefore, possible to prevent a reduction in the recording capacity of the magnetic tape.

In addition, since a plurality of blocks are handled as one group to make a decision as to the state of reproduction, processing for making the decision can be facilitated and the speed of the processing can be improved.

Although in the above-described embodiment each of the areas 15A, 15B and 15C in the memory circuit 15 is fixed, the areas 15A, 15B and 15C may be variable so that the memory arrangements thereof can be adequately varied according to the state of reproduction of data or the mode of reproduction. For example, if the mode of reproduction is set to "high-speed reproduction", the number of steps in the integration area 15A may be increased so that the degree of restoration of reproduced data can be enhanced.

Although in the above-described embodiment the shift timing of data in the memory circuit 15 is varied according to the result of detection of the above-described state of reproduction, the shift timing of data in the memory circuit 15 may be fixed.

Another embodiment of the present invention will be described below. For the sake of convenience of description, the same reference numerals are used to denote elements identical to those used in the above-described embodiment.

In the above-described embodiment, the distribution of reproduced block addresses is used as data for capstan control. However, in the embodiment which will be described below, to prevent reproduced data from being lost, capstan control is executed on the basis of the degree of allowance of the memory capacity of an integration area in a memory circuit. More specifically, the trace locus of a magnetic head occasionally traverses a plurality of tracks due to various causes such as a deviation in tape speed and the imperfect linearity of tracks. In this case, data may be reproduced not only from a track which is being primarily traced but also from a subsequent track spaced apart from the track by several tracks. In this case, if the degree of allowance of the memory capacity is extremely small, it may be impossible to specify a track address at which the data reproduced from the subsequent track are to be stored, with the result that the data may drop out. To cope with this problem, in this embodiment, capstan control is executed so that the degree of allowance of the memory capacity of the memory circuit (in this embodiment, the number of steps remaining in the integration area of the memory circuit) can be made approximately constant at all times.

Figure 15:
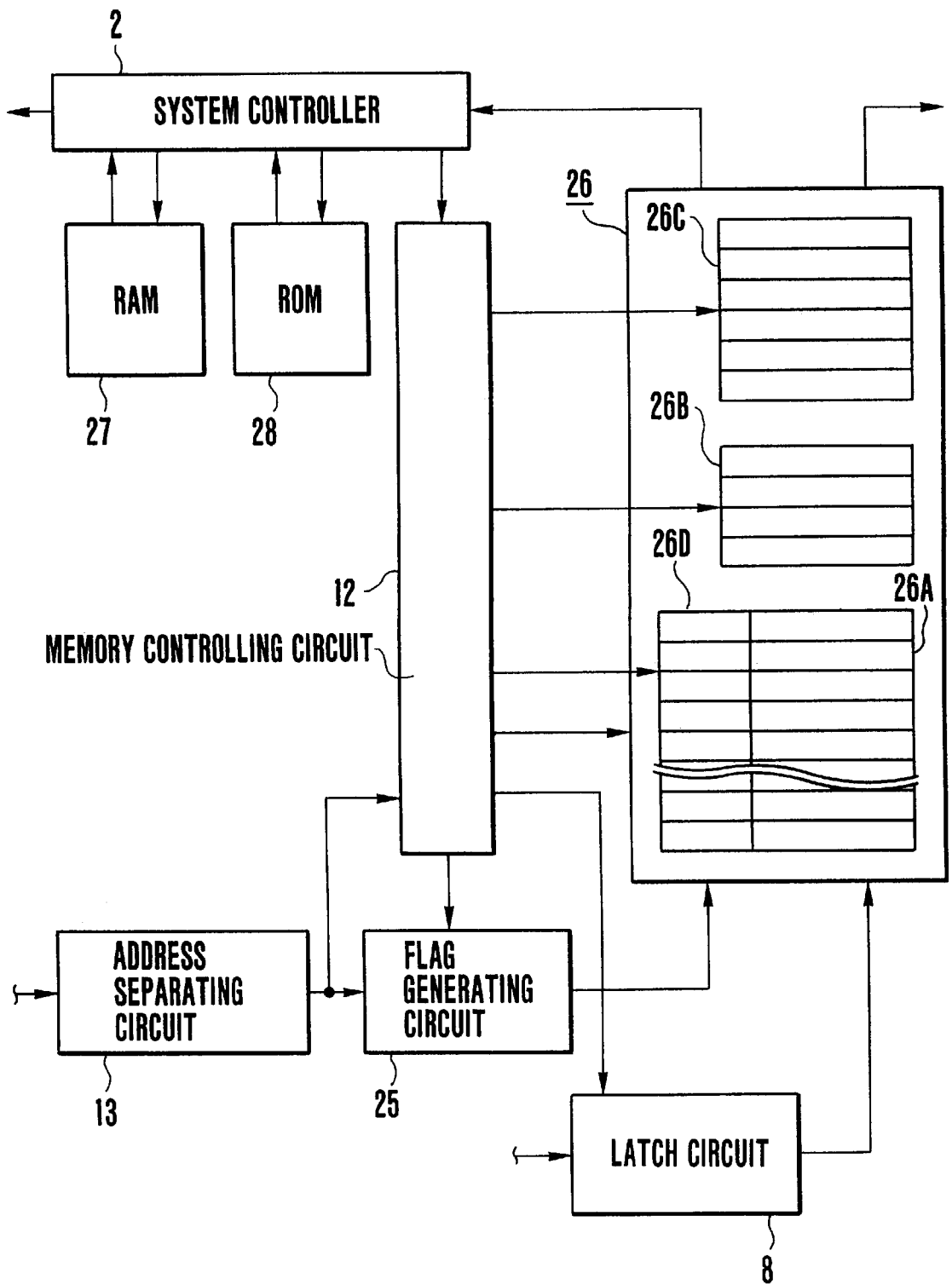
FIG. 15 is a block diagram schematically showing the arrangement of a reproducing apparatus according to another embodiment of the present invention.

In this embodiment, as shown in FIG. 15, an integration area 26A of a memory circuit 26 is provided with not only a data storing part but also a flag storing part 26D for storing a flag which indicates that at least one piece of block data has been reproduced from the corresponding track. In FIG. 15, reference numeral 26B denotes a correction and interpolation area, and reference numeral 26C denotes a read-out area.

An output from the address separating circuit 13 is supplied to each of the memory controlling circuit 12 and a flag generating circuit 25. The flag generating circuit 25 generates a flag which indicates that the supplied data have been reproduced from a track on which the supplied data is recorded. The generated flag is supplied to the memory circuit 26 under control of the memory controlling circuit 12 together with the data outputted from the latch circuit 8. The flag is stored in the flag storing part 26D of the memory circuit 26.

The flag stored in the flag storing part 26D of the memory circuit 26 is read out at a predetermined timing and supplied to the system controller 2 which sets and controls the operation of the memory controlling circuit 12.

The system controller 2 is provided with a first memory 27 for storing track numbers corresponding to all the steps from the lowermost step to the uppermost step which are arranged in the integration area 26A at that time, as well as for storing data indicative of the presence or absence of each of flags corresponding to the individual tracks. The system controller 2 is also provided with a second memory 28 which stores target-value data indicative of a target value of the tape speed which corresponds to the position of the lowermost step in which a flag is present. The system controller 2 selects a predetermined target-value data from the second memory 28 on the basis of the position of a flag (track number) supplied from the memory circuit 26 and the track number of the lowermost step, and execute capstan control on the basis of the selected target-value data.

Figure 16:
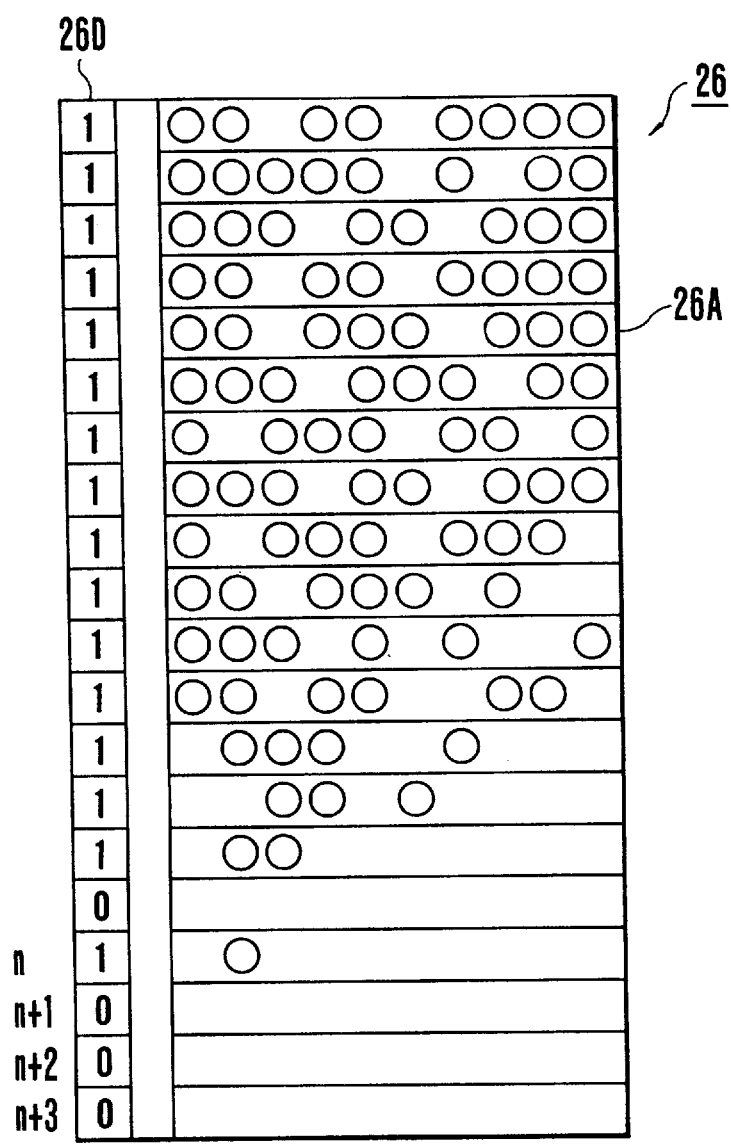
FIG. 16 is a schematic view showing reproduced data and a distribution pattern of flags on a memory circuit according to the embodiment shown in FIG. 15.

More specifically, the system controller 2 executes capstan control so that the difference between the track number (indicated by "n" in FIG. 16) of the lowermost step in which a flag is present and the track number (indicated by "n+3" in FIG. 16) of the lowermost step present in the integration area 26A at that time, can be made constant at all times ("3 steps" in the example shown in FIG. 16). If the aforesaid difference increases, the system controller 2 determines that the degree of allowance of the memory capacity of the integration area 26A has increased, and sets the target value of the tape speed to a higher value, thereby increasing the speed of tape travel. If the aforesaid difference decreases, the system controller 2 determines that the degree of allowance of the memory capacity of the integration area 26A has decreased, and sets the target value of the tape speed to a lower value, thereby decreasing the speed of tape travel.

In this embodiment, the shift of data in the memory circuit 26 is performed in synchronism with the timing at which reading from the read-out area 26C is performed.

Figure 17:
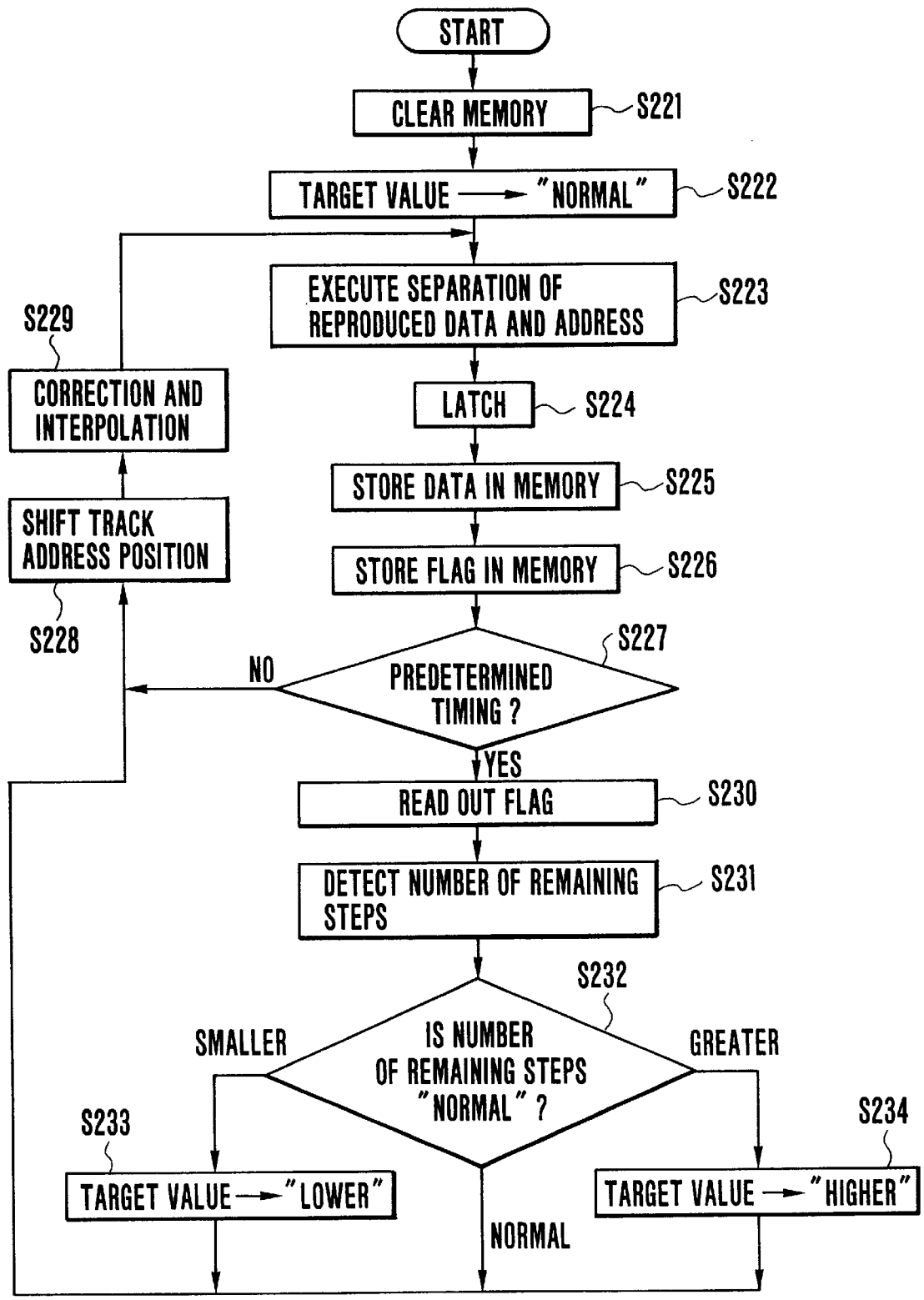
FIG. 17 is a flowchart showing an operation according to the embodiment shown in FIG. 15.

The operation of the apparatus having the above-described arrangement will be described below with reference to the flowchart of FIG. 17.

Initially, when a reproducing operation is started, the contents of each of the memory circuit 26 and the memory 27 are cleared (Step S221), and the target value of the tape speed is set to "normal" (Step S222). During this state, data, an address and the like are separated from a reproduction output of the magnetic head He1 or He2 (Step S223). After the separated data have been selectively latched by the latch circuit 8 (Step S224), the latched data are read out from the latch circuit 8 in synchronism with the operation of specifying a memory address on the basis of the separated address, and are then written into the memory circuit 26 (Step S225). Then, flags are generated and written into the flag storing part 26D of the memory circuit 26 (Step S226).

Then, it is determined whether the elapsed time after the start of the reproducing operation coincides with a predetermined timing (Step S227). If it is determined that the elapsed time does not coincide with the predetermined timing, the track address positions in each of the memory circuit 26 and the first memory 27 are shifted in the upward direction on a step-by-step basis (Step S228), and correction and interpolation of the data are performed (Step S229). Then, the process returns to Step S223.

The predetermined timing is determined by counting, for example, the number of PG pulses, and it is assumed in this embodiment that at the instant when the counted number of PG pulses reaches an integer multiple of 3, the aforesaid elapsed time coincides with the predetermined timing.

If it is determined in Step S227 that the elapsed time coincides with the predetermined timing, the aforesaid flags are read out from the flag storing part 26D of the aforesaid memory circuit 26 (Step S230) and the number of remaining steps is detected from the track number of the lowermost step in which a flag is present and the track number of the lowermost step of the integration area 26A in the memory circuit 26 (Step S231). Then, a decision is made as to the present state of tape travel from the result of the comparison (Step S232). If it is determined that the number of remaining steps is a predetermined number, the process returns to Step S228 without changing the target value of the tape speed. If it is determined that the number of remaining steps is smaller than the predetermined number, the target value of the tape speed is set to a lower value so that the tape speed is decreased (Step S233). Then, the process returns to Step S228.

If the number of remaining steps is greater than the predetermined number, the target value of the tape speed is set to a higher value so that the tape speed is increased (Step S234). Then, the process returns to Step S228.

Figure 18:
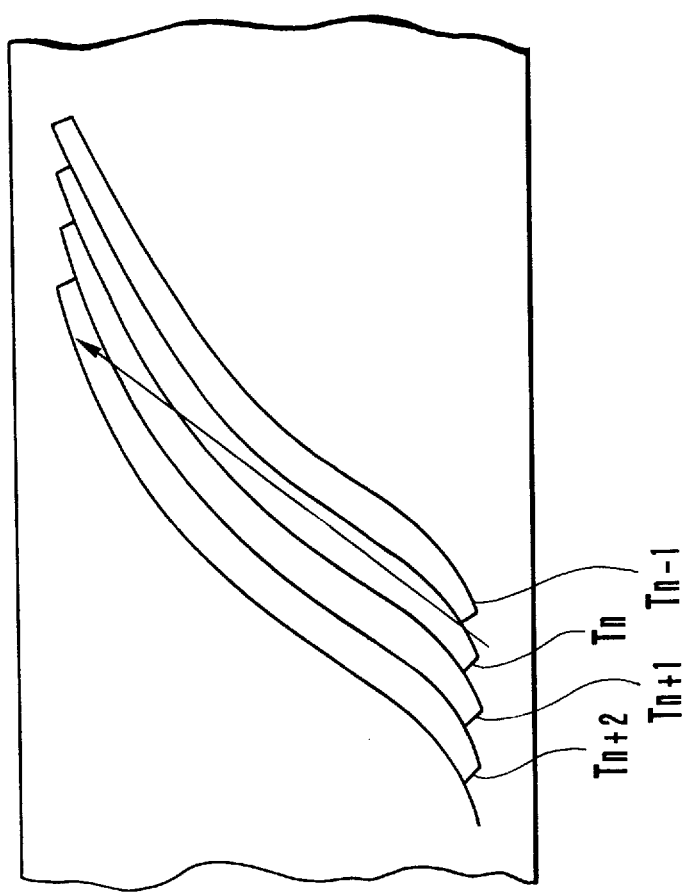
FIG. 18 is a schematic view showing the relationship between tracks of imperfect linearity and trace loci of a magnetic head in relation to the embodiment shown in FIG. 15.

In the above-described embodiment, capstan control is executed so that the degree of allowance of the memory capacity of the memory circuit 26 is made constant at all times. Accordingly, even if the linearity of tracks is imperfect as shown in FIG. 18 and data are reproduced not only from a track (Tn) which is being primarily traced but also from a subsequent track (Tn+2) spaced apart from the track by several tracks, since a track address corresponding to the track (Tn+2) is specified within the integration area 26A, it is possible to prevent the reproduced data from being lost in the memory circuit 26.

In the above-described embodiment, since it is not necessary to use a dedicated memory for storing the aforesaid flags, it is possible to simplify the circuit arrangement of the entire apparatus and a reduction in cost can be realized.

Another embodiment of the present invention will be described below. For the sake of convenience of description, the same reference numerals are used to denote elements identical to those used in the above-described embodiment.

The basic concept of the embodiment which will be described below is based on the property that the position (pattern) of distribution of reproduced data on a memory corresponds to the position (pattern) of trace loci formed on a magnetic tape as the magnetic tape is moved during reproduction, i.e., the position of reproduction on the magnetic tape, and is intended to execute capstan control according to the position on a memory of data reproduced by one trace.

Figure 19:
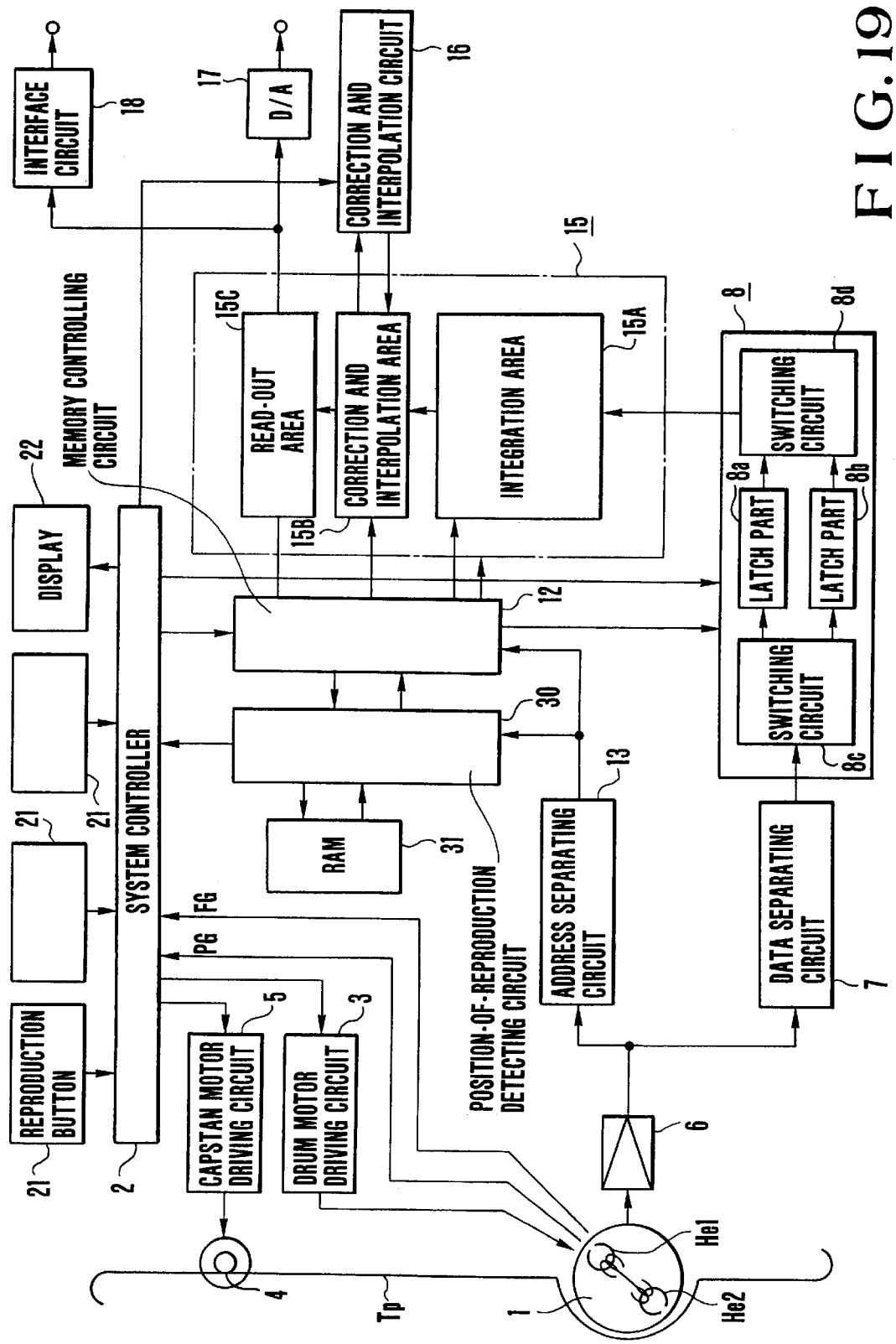
FIG. 19 is a block diagram schematically showing the arrangement of a reproducing apparatus according to another embodiment of the present invention.

In this embodiment, as shown in FIG. 19, address data outputted from the address separating circuit 13 is supplied to a position-of-reproduction detecting circuit 30. The position-of-reproduction detecting circuit 30 is provided with a memory (RAM) 31 having an address arrangement similar to that of the integration area 15A of the memory circuit 15. The memory (RAM) 31 is arranged such that when address data is reproduced, a flag is set at an address position on the memory 31 which corresponds to the address data.

Data indicative of the thus-detected position of reproduction is supplied to the system controller 2 through the position-of-reproduction detecting circuit 30, and the system controller 2 sets a target value of the tape speed in accordance with the supplied data indicative of the position of reproduction.

In this embodiment, the tape speed is controlled so that data indicative of the position of reproduction can be located in the middle of the memory 31. For example, if the data indicative of the position of reproduction are located on an upper side (output side) of the memory 31, the memory controlling circuit 12 determines that the memory capacity of the memory circuit 15 has a certain degree of allowance, and sets the target value of capstan control to a higher value so that the tape speed can be increased. In contrast, if the data indicative of the position of reproduction are located on a lower side (input side) of the memory 31, the system controller 2 determines that the memory capacity of the memory circuit 15 has no allowance, and sets the target value of capstan control to a lower value so that the tape speed can be decreased.

In this embodiment, each time one trace is performed, the memory 31 is rewritten so that the contents of the memory 31 can always indicate the latest position of reproduction.

In this embodiment, the shift of data in the memory circuit 15 is performed in synchronism with the timing at which reading from the read-out area 15C is performed.

Figure 20:
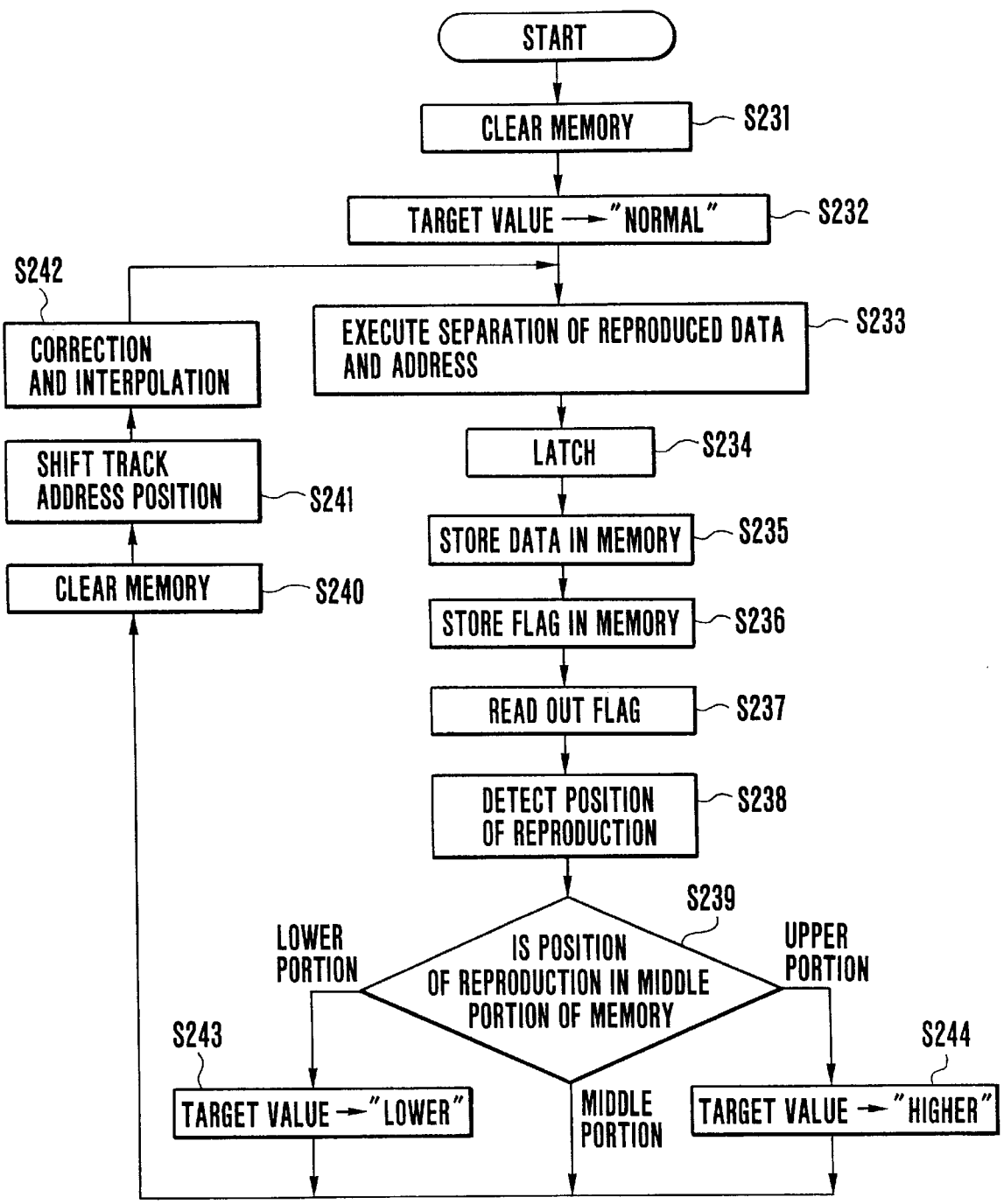
FIG. 20 is a flowchart showing an operation according to the embodiment shown in FIG. 19.

The operation of the embodiment having the above-described arrangement will be described below with reference to the flowchart of FIG. 20.

Initially, when a reproducing operation is started, the contents of each of the memory circuit 15 and the memory 31 are cleared (Step S231), and the target value of the tape speed is set to "normal" (Step S232). During this state, data, an address and the like are separated from a reproduction output of the magnetic head He1 or He2 (Step S233). After the separated data have been latched by the latch circuit 8 (Step S234), the latched data are read out from the latch circuit 8 in synchronism with the operation of specifying a memory address on the basis of the separated address, and are then written into the memory circuit 15 (Step S235). Then, flags are generated and written into the memory 31 (Step S236).

Then, the flags are read out from the memory 31 (Step S237), and the position of reproduction is detected from the flag data (Step S238). Then, it is determined from the result of the detection which of the middle, the upper side and the lower side of the memory 31 corresponds to the position of reproduction (Step S239). If data indicative of the position of reproduction are located in the middle of the memory 19, the tape speed is not changed and the contents of the memory 19 are cleared (Step S240), and each track address position in the memory circuit 15 is shifted in the upward direction by one step (Step S241). Then, the data outputted from the memory circuit 15 is subjected to correction and interpolation (Step S242), and the process returns to Step S233.

If the data indicative of the position of reproduction are located on the upper side of the memory 31, the target value is set to a higher value so that the tape speed can be increased (Step S244), and the process returns to Step S240.

If the data indicative of the position of reproduction are located on the lower side of the memory 31, the target value is set to a lower value so that the tape speed can be decreased (Step S243), and the process returns to Step S240.

As is apparent from the above description, in the aforesaid embodiment, the position on the memory 31 of reproduced data obtained by one trace is detected to infer the trace locus of the magnetic head He1 or He2, thereby detecting the tape speed. Accordingly, it is possible to eliminate the need to record special tracking signals on a recording medium.

In the above-described embodiment, capstan control is performed so that the data indicative of the position of reproduction can be located in the middle of the memory 31, on the basis of reproduced data obtained by one trace. However, the capstan control may be performed on the basis of the number of remaining steps, that is, the number of steps between a step immediately below the lowermost step of the reproduced data obtained by one trace and the lowermost step of the memory 31.

Otherwise, the capstan control may be performed so that the step n corresponding to the middle position of reproduction can be located at the middle position between the steps n−1 and n+2 shown in FIG. 10.

As is apparent from the above description, according to each of the embodiments shown in FIGS. 12 through 20, the travel of a recording medium is controlled on the basis of the state of distribution on a memory of data reproduced from the recording medium, whereby it is possible to eliminate the need to record a special control signal on the recording medium. Accordingly, it is possible to prevent a reduction in the recording area of the recording medium.

What is claimed is:

1. A reproducing apparatus comprising:
   (a) reproducing means for reproducing data recorded on a recording medium;
   (b) memory means for storing data obtained by said reproducing means, said memory means having a plurality of memory areas including a first memory area which receives the data from said reproducing means and a second memory area which receives data read out from the first memory area;
   (c) reading means for reading the data from the second memory area at a predetermined timing; and
   (d) controlling means for controlling a reproducing operation of said reproducing means and a transmitting timing of the data from the first memory area to the second memory area according to a data filling degree of the first memory area, said controlling means controlling said reproducing means so as to vary the data amount obtainable per unit time gradually.

2. A reproducing apparatus according to claim 1, wherein said reproducing means includes a mechanism for relatively moving a magnetic head with respect to the recording medium.

3. A reproducing apparatus according to claim 2, wherein the mechanism has a motor for driving the magnetic head and/or the recording medium.

4. A reproducing apparatus according to claim 1, wherein the recording medium includes a magnetic tape.

5. A reproducing apparatus according to claim 4, wherein various kinds of data are recorded on the magnetic tape in the form of a plurality of tracks.

6. A reproducing apparatus according to claim 5, wherein the various kinds of data include a track address.

7. A reproducing apparatus according to claim 1, wherein said memory means stores the data in memory on the basis of the predetermined pattern to restore the data in the memory in the predetermined pattern.

8. A reproducing apparatus according to claim 7, wherein said controlling means includes means for detecting a state of restoration of the data restored in said memory means.

9. A reproducing apparatus comprising:
   (a) reproducing means for reproducing data including an information signal and address data related to the information signal from a recording medium;
   (b) memory means for storing the information signal obtained by said reproducing means; and
   (c) controlling means for writing the information signal into said memory means according to the address data reproduced by said reproducing means,
   said controlling means changing a memory area in which the information signal represented by predetermined address data according to a data filling condition of the information signal stored in said memory means.

10. A reproducing apparatus according to claim 9, wherein the memory arrangement of said memory means corresponds to the predetermined pattern.

11. A reproducing apparatus according to claim 9, wherein the recording medium includes a magnetic tape.

12. A reproducing apparatus according to claim 11, wherein various kinds of data are recorded on the magnetic tape in the form of a plurality of tracks.

13. A reproducing apparatus according to claim 12, wherein the various kinds of data include a track address.

14. A reproducing apparatus comprising:
   (a) driving means for driving a recording medium on which various kinds of data are recorded in a predetermined pattern;
   (b) reproducing means for reproducing the data from the recording medium;
   (c) memory means for storing data obtained by said reproducing means, said memory means having a memory arrangement corresponding to the predetermined pattern and a plurality of memory areas including a first memory area which receives the data from said reproducing means and a second memory area which receives data read out from the first memory area; and
   (d) controlling means for controlling a driving operation of said driving means and a transmitting timing of the data from the first memory area to the second memory area according to a data filling degree of the first memory area, said controlling means controlling said driving means so as to vary the data amount obtainable per unit time gradually.

15. A reproducing apparatus according to claim 14, wherein the recording medium includes a magnetic tape.

16. A reproducing apparatus according to claim 14, wherein said reproducing means has a magnetic head.

17. A reproducing apparatus according to claim 14, wherein said controlling means controls a driving speed of said driving means.

18. A reproducing apparatus according to claim 15, wherein various kinds of data are recorded on the magnetic tape in the form of a plurality of tracks.

19. A reproducing apparatus according to claim 18, wherein the various kinds of data include a track address.

20. A reproducing apparatus according to claim 14, wherein said controlling means includes means for detecting a state of restoration of the data restored in said memory means.

21. A controlling method for use in a reproducing apparatus arranged to reproduce digital data recorded on a recording medium in the form of predetermined units and restore the digital data on a memory circuit having a plurality of memory areas in the form of the predetermined units including a first memory area which receives the data from reproducing means and a second memory area which receives data read out from the first memory area, wherein a travel speed of the recording medium and a transmitting timing of the data stored in the memory circuit from the first memory area to the second memory area are controlled according to a data filling degree of the first memory area,
   the travel speed of the recording medium being controlled so as to vary the data amount obtainable per unit time gradually.

22. A reproducing apparatus according to claim 1, wherein said controlling means controls a transmitting timing of the data stored in said memory means from the first memory area to the second memory area.

23. A reproducing apparatus according to claim 14, wherein said controlling means controls a transmitting timing of the data stored in said memory means from the first memory area to the second memory area.

24. A data reproducing apparatus, comprising:
   (a) reproducing means for reproducing data from a recording medium;
   (b) a first memory for receiving the data reproduced by said reproducing means and storing the received data;
   (c) a second memory for receiving the data read out from the first memory and storing the received data read out from the first memory;
   (d) reading means for reading the data from said second memory at a predetermined timing; and
   (e) controlling means for controlling a reproducing operation of said reproducing means and a transmitting operation of the data stored in the first memory from the first memory to the second memory according to a condition of the data stored in the first memory.

25. An apparatus according to claim 24, wherein said controlling means controls said reproducing means so as to vary the data amount obtainable per unit time gradually.

26. An apparatus according to claim 24, wherein said controlling means controls a transmitting timing of the data stored in the first memory from the first memory to the second memory.

27. An apparatus according to claim 24, wherein the data reproduced by said reproducing means includes image data and address data, the first memory stores the image data according to the address data.

28. An apparatus according to claim 24, wherein said reproducing means includes a mechanism for relatively moving a magnetic head with respect to the recording medium.

29. An apparatus according to claim 24, wherein said reproducing means has driving means for driving the recording medium, and wherein said controlling means controls said driving means so as to change a driving speed of the recording medium according to the condition of the data stored in the first memory.

30. An apparatus according to claim 24, wherein the recording medium includes a magnetic tape.

31. An apparatus according to claim 30, wherein various kinds of data are recorded on the magnetic tape in the form of a plurality of tracks.

32. A data reproducing apparatus, comprising:

reproducing means for reproducing digital data from a recording medium, said reproducing means having driving means for driving the recording medium;

first memory means for receiving the digital data reproduced by said reproducing means and storing the received digital data;

second memory means for receiving the digital data read out from said first memory means and storing the digital data from said first memory means;

reading means for reading the digital data from said second memory means at a predetermined timing; and controlling means for controlling said driving means so as to change a driving speed of the recording medium and a transmitting timing of the digital data stored in the first memory means from said first memory means to said second memory means according to a data filling condition of the digital data stored in said first memory means.

33. A reproducing apparatus according to claim 32, further comprising error correction means for correcting errors in the digital data stored in said first memory means.

* * * * *